United States Patent
Lee et al.

(10) Patent No.: US 6,621,809 B1
(45) Date of Patent: Sep. 16, 2003

(54) DEVICE AND METHOD FOR GATING TRANSMISSION IN A CDMA MOBILE COMMUNICATION SYSTEM

(75) Inventors: Hyun-Seok Lee, Songnam-shi (KR); Dae-Cyun Kim, Seoul (KR); Jae-Min Ahn, Seoul (KR); Chang-Hoi Koo, Songnam-shi (KR); Hoon Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/454,576

(22) Filed: Dec. 7, 1999

(30) Foreign Application Priority Data

Jul. 12, 1998 (KR) .......................................... 1998-54053
Apr. 24, 1999 (KR) .......................................... 1999-14771
Jun. 15, 1999 (KR) .......................................... 1999-22393

(51) Int. Cl.[7] .............................................. H04B 7/216
(52) U.S. Cl. ........................ 370/335; 370/342; 370/350; 455/435; 455/450
(58) Field of Search ................................ 370/335, 342, 370/336, 337, 347, 348, 329, 350; 455/450, 509, 510, 522, 435

(56) References Cited

U.S. PATENT DOCUMENTS

| | | | |
|---|---|---|---|
| 5,659,569 A | * | 8/1997 | Padovani et al. ........... 370/479 |
| 5,857,147 A | * | 1/1999 | Gardner et al. ............. 455/67.1 |
| 5,867,527 A | * | 2/1999 | Ziv et al. ..................... 375/208 |
| 5,914,950 A | * | 6/1999 | Tiedemann, Jr. et al. ... 370/348 |
| 5,923,650 A | * | 7/1999 | Chen et al. .................. 370/331 |
| 6,005,852 A | * | 12/1999 | Kokko et al. ................ 370/329 |
| 6,031,831 A | * | 2/2000 | Tan Boon et al. .......... 370/342 |
| 6,240,076 B1 | * | 5/2001 | Kanerva et al. ............. 370/330 |
| 6,286,122 B1 | * | 9/2001 | Alanara ....................... 714/781 |

* cited by examiner

Primary Examiner—Edward F. Urban
Assistant Examiner—Temica M. Davis
(74) Attorney, Agent, or Firm—Dilworth & Barrese, LLP

(57) ABSTRACT

A method for determining a gating rate in a base station for a CDMA communication system is disclosed. The method comprises transmitting information for assigning a dedicated control channel and a traffic channel to a mobile station, when a call is generated; after call setup, transmitting a message requesting mobile station's capability information to the mobile station; receiving the capability information including gating availability information of a reverse pilot signal and information about at least one gating rate, transmitted from the mobile station in reply to the request message; and determining a gating rate according to the capability information, transmitting information about the determined gating rate to the mobile station, and transitioning to an active sate. The mobile station's capability information includes information about gating availability and at least one gating rate, when gating is available.

13 Claims, 23 Drawing Sheets

DEVICE AND METHOD FOR GATING TRANSMISSION IN A CDMA MOBILE COMMUNICATION SYSTEM

PRIORITY

This application claims priority to an application entitled "Device and Method for Gating Transmission in Control Hold State in CDMA Mobile Communication System" filed in the Korean Industrial Property Office on Dec. 7, 1998 and assigned Ser. No. 98-54053; Korean Application No. 99-14771, filed on Apr. 24, 1999; and Korean Application No. 22393, filed on Jun. 15, 1999. The contents of these applications are hereby incorporated by reference.

BACKGROUND OF THE INVENTION

1. Field of the Invention

The present invention relates generally to a communication device and method for a CDMA mobile communication system, and in particular, to a device and method for gating transmission.

2. Description of the Related Art

A conventional CDMA (Code Division Multiple Access) mobile communication system primarily provides a voice service. However, the future CDMA mobile communication system will support the IMT-2000 standard, which can provide a high-speed data service as well as the voice service. More specifically, the IMT-2000 standard can provide high-quality voice service, moving picture service, Internet search service, etc.

In a mobile communication system, data communication service is typically characterized by transmissions of burst data alternates with long non-transmission periods. The bursts of data are referred to as "packets" of data. Data communication service in future mobile communication systems will employ a channel assignment method in which a dedicated channel is assigned only for the duration of the data transmission. That is, because of limited radio resources, base station capacity and power consumption of a mobile station, the mobile communication system connects a traffic channel and a control channel only for an actual data transmission duration and otherwise releases the dedicated channels (i.e., the traffic channel and the control channel) when there is no data transmitted for a predetermined amount of time. When the dedicated channels are released, subsequent communication is performed through a common channel, thus increasing utilization efficiency of the radio resources.

To accomplish this, the system supports various states based upon channel assignment circumstances and the existence or nonexistence of certain state information. FIG. 1 shows a state transition diagram for a data packet service in a mobile communication system.

Referring to FIG. 1, for packet service, there is an active state, a control hold state, a suspended state and a dormant state. In the control hold state, active state and suspended state, a data service option is connected, and in the other state, the service option is disconnected.

In the active state, data is transmitted between the mobile terminal and the base station using a dedicated traffic channel. The dedicated traffic channel becomes available when the data service transitions to the active state after connection of the service option. A base station and a mobile station perform initialization procedures of a radio link protocol (RLP) and a point-to-point protocol (PPP). When there is no data transmitted for a predetermined time $T\_{Active}$ in the active state, a transition occurs to the control hold state, whereupon the dedicated traffic channel is released. At this point, if it is judged that no data will be generated for a relatively long time (based on a prediction of the traffic to be generated thereafter), a direct transition to the suspended state or the dormant state takes place without passing through the control hold state.

If it is predicted that the traffic will be generated within a shorter time period, the control hold state is entered. In the control hold state, the service option, RLP-related information and PPP-related information are maintained in the base station and the mobile station, and a dedicated signaling channel (dsch) and a dedicated traffic channel (dtch) (the lower case representing that they are logical channels) are established in a dedicated control channel (DCCH), which is a physical channel. In this state, when data to be transmitted is generated within a predetermined time $T\_{Hold}$, the data service establishes a dedicated traffic channel (DTCH, a supplement channel or fundamental channel, which are physical channels) and makes a transition back to the active state, in order to transmit the data. Otherwise, when no data is generated for the predetermined time $T\_{Hold}$, the data service releases the dedicated control channel and then transitions to the suspended state. At this point, if it is judged that no data will be generated for a relatively long time based on a prediction of the traffic to be generated thereafter, a direct transition to the dormant state takes place without passing through the suspended state.

In the suspended state, the dedicated physical channels of the fundamental channel and the dedicated control channel, which were assigned to each mobile station, are released, thus the logical channels of the dedicated signaling channel (dsch), the dedicated traffic channel (dtch), and the dedicated medium access control channel (dmch) are all released. At this point, communication with the base station is performed using a common channel established in the physical channels of a paging channel and an access channel, which are commonly used by a plurality of mobile stations. However, in the suspended state, the information related to the service option, RLP-related information, and PPP-related information are still maintained in the base station and the mobile station. If data to be transmitted is generated within a predetermined time $T\_{Suspended}$ in the suspended state, the dedicated control channel and the dedicated traffic channel are both established to make a transition back to the active state. When no data is generated for transmission within the predetermined time $T\_{Suspended}$, a transition to the dormant state happens.

In the dormant state, only the PPP is open for the data service and other call-related information is all discarded. When it is necessary to transmit data within a predetermined time $T\_{Dormant}$ in the dormant state, a dedicated signaling channel is assigned and then a transition to the active state occurs. Otherwise, when no data is generated for the predetermined time $T\_{Dormant}$, even the PPP-related information is released and a transition to a packet null state occurs.

A conventional CDMA mobile communication system which mainly supports voice service, releases a traffic channel upon completion of data transmission and then reconnects the traffic channel when it is required to transmit data. However, the conventional channel assignment method is not suitable for a packet data service because of the time delay for reconnection of the channel. Therefore, to provide both packet data service and voice service, a new channel assignment method is required.

In general, during packet data service, data transmission occurs intermittently. Therefore, periods of packet data transmission alternate with periods of non-transmission. The mobile communication system either releases or maintains a channel in use for the periods of non-transmission. However, there are drawbacks associated with either maintaining or releasing a channel. Release of the channel causes an increase in service time due to a time delay for reconnection of the channel, and maintaining the channel causes a waste of the channel resources.

To solve these problems, there is proposed a method in which a dedicated control channel is provided between a base station and a mobile station to exchange traffic channel-related control signals over the dedicated control channel for the data transmission duration. The traffic channel is released and only the dedicated control channel is maintained for the non-transmission duration. In this manner, the mobile communication system can prevent a waste of the channel resources and rapidly reconnect the traffic channel when there is data to transmit. The operating state described above is called a control hold state.

The dedicated control channel, a physical channel, provides effective implementation of the control hold state. Unlike the fundamental channel used in existing systems, the dedicated control channel used in the control hold state is a physical channel. This provides a reduction in transmission power by not transmitting null traffic when there is no message or data to transmit.

In the control hold state, the dedicated control channel transmits no signal, when there is no signaling message to transmit. In future CDMA mobile communication systems, while the dedicated control channel is maintained, the mobile station transmits a reverse pilot channel to the base station over the dedicated control channel. The reverse pilot channel constantly transmits a signal, regardless of discontinuous transmission (DTX). Further, even a power control bit (PCB) is transmitted over the reverse pilot channel by multiplexing.

In the conventional method, to avoid a synch re-acquisition procedure in the base station while the dedicated control channel is not activated during the control hold state, the mobile station continuously transmits a reverse pilot channel signal in the control hold state. However, continuous transmission of the reverse pilot channel signal will increase interference between the reverse links, thereby causing a reduction in capacity of the reverse link. To solve this problem, there is a demand for a method of decreasing a period of a power control signal transmitted over a forward dedicated control channel, when there is no data to transmit over the dedicated control channel.

The present invention is based on Korean patent applications Nos. 98-28237, 98-29180 and 98-34146, all hereby incorporated by reference. These applications disclose a gating function, in which for the periods of non-transmission, the mobile station transmits an intermittent reverse pilot signal and the base station sends an intermittent power control signal to the mobile station over the dedicated control channel.

In addition, the present invention is based on Korean patent application Nos. 98-11381, 98-4498, 98-9389, 98-13958, 98-14878 and 98-36383, all hereby incorporated by reference. These applications disclose the IMT-2000 forward/reverse channel structure and the dedicated control channel.

In order to support the gating function between the mobile station and the base station, the following requirements should be satisfied. First, when the gating function is an optional function rather than a mandatory function supported in the mobile station and the base station, a control signal is required to make a negotiation for a supportable function between the mobile station and the base station. Second, a procedure for synchronizing the period of the power control signal is required to perform the gating function, between the mobile station and the base station. Third, since the gating function requires the procedure for synchronizing an operation between the base station and the mobile station, a control signal is required for synchronizing a gating-on time and a gating-off time between the base station and the mobile station. The invention discloses a method for meeting these requirements.

SUMMARY OF THE INVENTION

It is, therefore, an object of the present invention to provide a signal transmission device and method for implementing a gating function for the duration where there is no packet data to transmit, in a mobile communication system.

It is another object of the present invention to provide a signal transmission device and method for implementing a gating function in P2 and P3 packet service modes of operation.

It is further another object of the present invention to provide a signal processing device and method for enabling a negotiation for a supportable function between a base station and a mobile station, after which a gating function is supplementally supported in the base station and the mobile station.

It is yet another object of the present invention to provide a device and method for synchronizing a period of a power control signal necessary to perform a gating function, between a base station and a mobile station.

It is still another object of the present invention to provide a control device and method for synchronizing a gating-on time and a gating-off time between a base station and a mobile station in order to synchronize the gating operation therebetween.

To achieve the above objects, there is provided a method for determining a gating rate in a base station for a CDMA communication system. The method comprises transmitting information for assigning a dedicated control channel and a traffic channel to a mobile station, when a call is generated. After call setup, a message is transmitted to the mobile station requesting the mobile station's capability information. The capability information is generated, including gating information of a reverse pilot signal and information about at least one gating rate and then transmitted from the mobile station in reply to the request message. A gating rate is determined according to the capability information and then transmitted to the mobile station. The system also transitions to an active state. The mobile station's capability information includes information about gating availability and at least one gating rate, when gating is available.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A description of the invention will be made with reference to material disclosed in Korean patent application No. 98-11381.

In a CDMA communication system, when only a control signal is transmitted and received over the dedicated control channel between the base station and the mobile station and the physical channel has discontinuous transmission (DTX) or gating transmission, the channel resources can be reduced. Also, when transmission data is generated, a transmission/receiving method can be quickly returned through the control signal. In the present invention, the state where only a control signal can be transmitted and received and the physical channels are in discontinuous transmission and reception or gating transmission and reception is called "control hold state".

Figure 1:
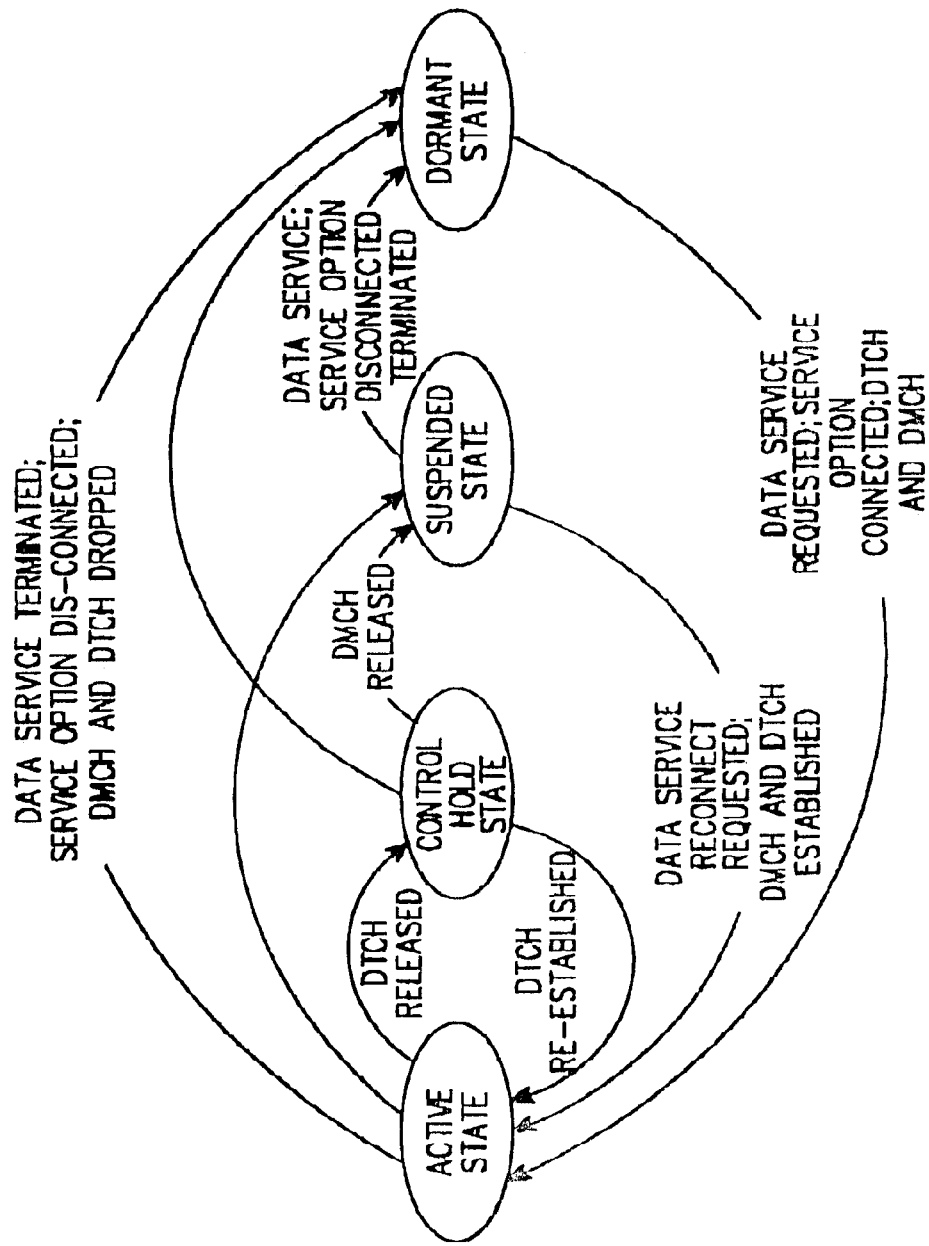
FIG. 1 is a representative drawing of a system that supports the present invention.
Figure 2:
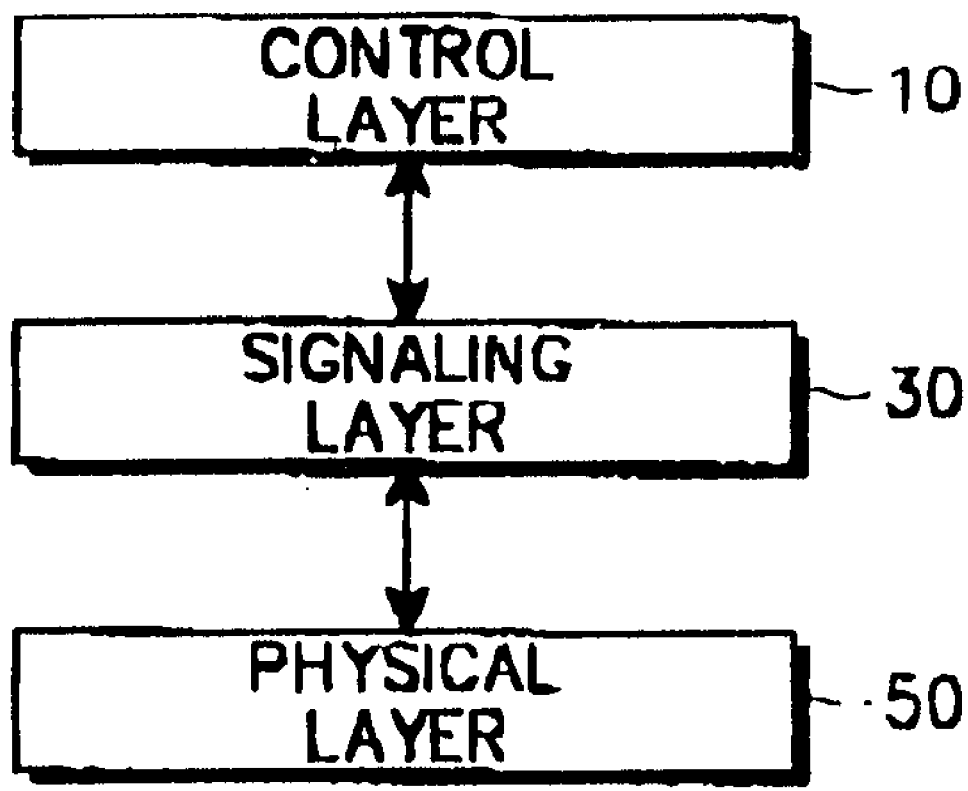
FIG. 2 is a block diagram of a controller according to the present invention.

The present invention is described using FIG. 2. In FIG. 2, a control layer 10 and a signaling layer 30 comprise a controller, and a physical layer 50 refers to respective transmission channels. A memory device (not shown) connected to the controller stores an operating program of the invention, and a program and data for controlling radio resources (e.g., orthogonal code and transmitter). A message generator (not shown), under the control of the controller of FIG. 2, generates various messages defined by the invention, such as a dedicated control channel message, a paging channel message and an access channel message.

A base station and a mobile station of the novel CDMA communication system communicate a control signal and data over the dedicated control channel, the supplemental channel and the fundamental channel, which are established in the active state. The supplemental channel is released and the fundamental channel is used to perform gated transmission, when a transition occurs from the active state to the control hold state. At this point, the base station gates a signal for transmission over the forward dedicated control channel, and the mobile station gates a signal for transmission over the reverse pilot channel. Therefore, the base station and the mobile station determine a gating rate to be used in the control hold state during call setup, and upon transition to the control hold state, gate the signals being transmitted over the above channels according to the previously determined gating rate.

Herein, the invention will be described with reference to first and second embodiments. In the first embodiment, a gating rate is determined in the call setup process. Upon transition to the control hold state, the base station and the mobile station determine the gating rate by performing a negotiation based on the first determined gating rate, and then perform gated transmission. In the second embodiment, a gating rate is determined in the call setup process, and upon transition to the control hold state, the base station sends information about the determined gating rate and an operating time to the mobile station to perform gated transmission.

Prior to describing the embodiments, reference will be made to the transmission signal format of the base station and the mobile station according to an embodiment of the present invention.

Figure 3:
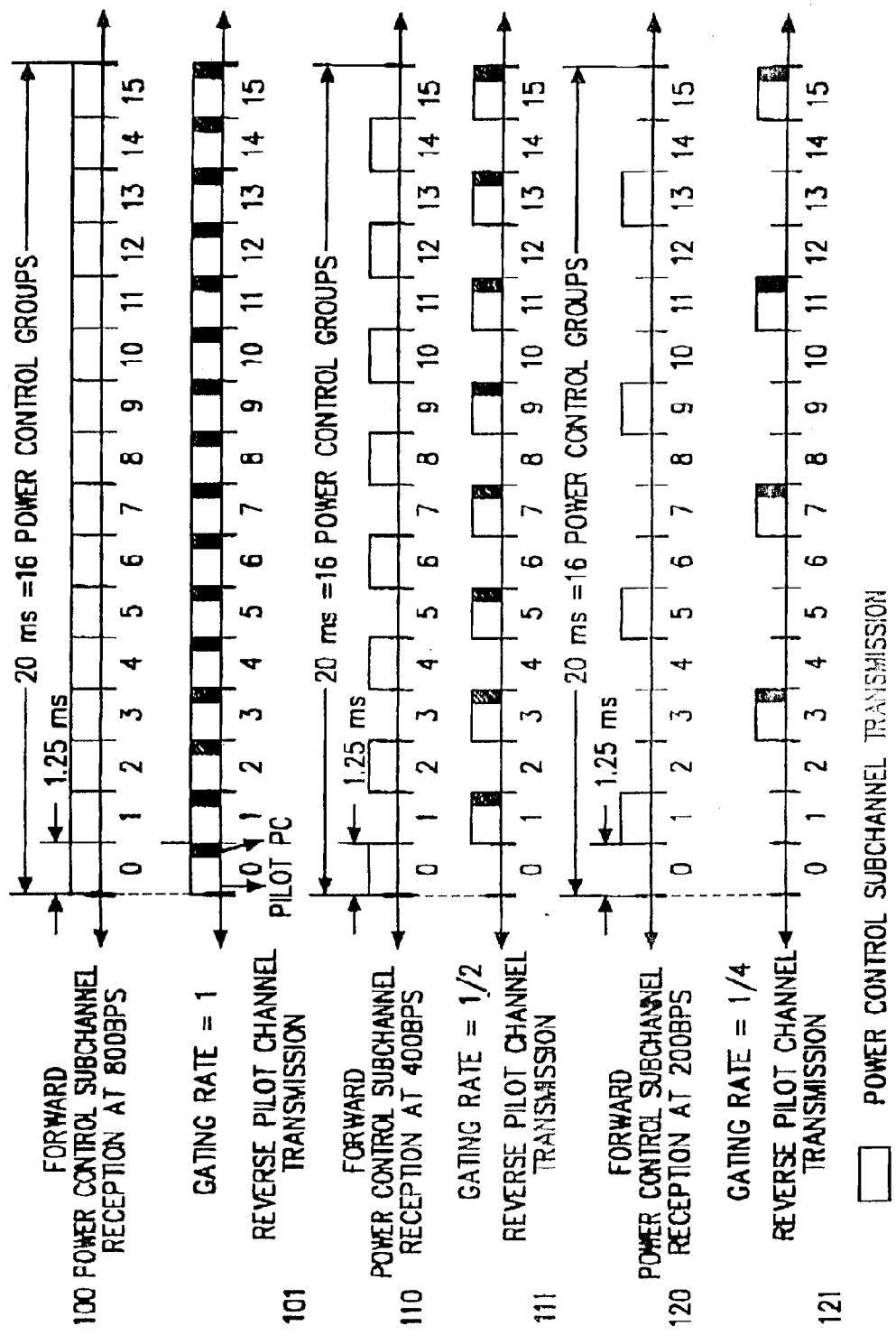
FIG. 3 shows transmission signal formats of the base station and the mobile station according to the present invention.

In FIG. 3, reference numerals 100, 101, 110, 111, 120 and 121 show signal transmission patterns according to a regular/gated transmission method of the reverse pilot channel in the control hold state. Reference numeral 101 shows that every power control group (PCG) is transmitted over the reverse pilot channel in the control hold state when the gating rate is regular (GR=1). Reference numeral 100 shows a transmission signal on the forward power control subchannel for the GR=1 regular transmission when the reverse dedicated control channel (R-DCCH) is not activated (i.e., a period of non-transmission) in the control hold state. When one power control bit (PCB) is transmitted in every power control group as shown by the reference numerals 100 and 101, both the forward link and the reverse link are power controlled at the same time interval.

The power control group can be replaced with a time slot. Reference numeral 111 shows that every second power control group is regularly transmitted in the control hold state, when the gate rate is ½ (i.e., only ½ of the power control groups are transmitted in one frame). Reference numeral 110 shows a power control signal received from the base station for the case when GR=½ regular/gated transmission when the R-DCCH is not activated in the control hold state. For the GR=½ regular/gated transmission, both the forward link and the reverse link are power controlled at the same time interval.

Reference numeral 121 shows that every fourth power control group is regularly transmitted in the control hold state, when the gate rate is ¼ (i.e., only ¼ of the power control groups are transmitted in one frame). The reference numeral 120 shows a power control signal received from the base station for the GR=¼ regular/gated transmission when the R-DCCH is not activated in the control hold state. For the GR=¼ regular/gated transmission, both the forward link and the reverse link are power controlled at the same time interval.

Although the reference numerals 110, 111, 120 and 121 of FIG. 2 show regular gated transmission, it is also possible to perform irregular gated transmission according to a pattern previously scheduled between the base station and the mobile station.

Figure 4:
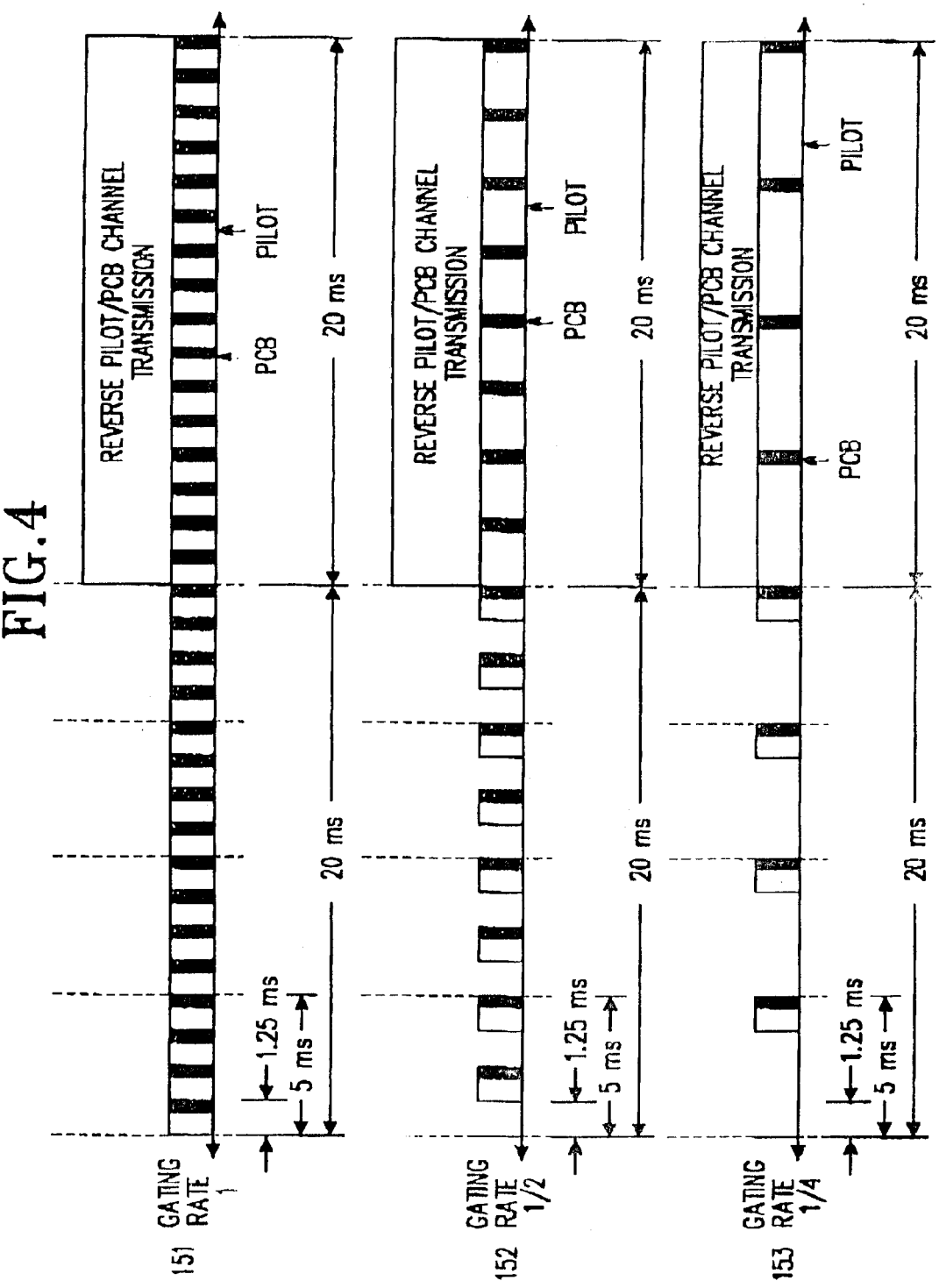
FIG. 4 shows methods of transmitting a reverse pilot channel signal in the control hold state when the dedicated control channel is activated according to the present invention.

In FIG. 4, reference numerals 151, 152 and 153 show methods for transmitting the reverse pilot channel signal in the control hold state when the dedicated control channel is activated.

Referring to FIG. 4, with regard to the reference numeral 151, when the gating rate is set to 1 in the control hold state, the reverse pilot channel is continuously transmitted upon activation of the dedicated control channel. With regard to the reference numeral 152, when the dedicated control channel is activated during GR=½ gated transmission in the control hold state, the mobile station transmits the PCB at the gating rate ½ and continuously transmits the pilot signal over the reverse pilot channel, so as to enable the base station to easily perform sync acquisition. With regard to the reference numeral 153, when the dedicated control channel is activated during GR=¼ gated transmission in the control hold state, the mobile station transmits the PCB at the gating rate ¼ and continuously transmits the pilot signal over the reverse pilot channel, so as to enable the base station to easily perform sync acquisition.

As shown in FIG. 4, when a transition to the active state occurs while performing gated transmission on the transmission signal according to a gating rate set between the base station and the mobile station in the control hold state, the mobile station gates transmission of the PCB according to the set gating rate. The pilot signal is continuously transmitted, regardless of the gating rate, so as to allow the base station to rapidly acquire synchronization. The base station rapidly acquires synchronization by continuously receiving the reverse pilot signal transmitted from the mobile station.

Figure 5:
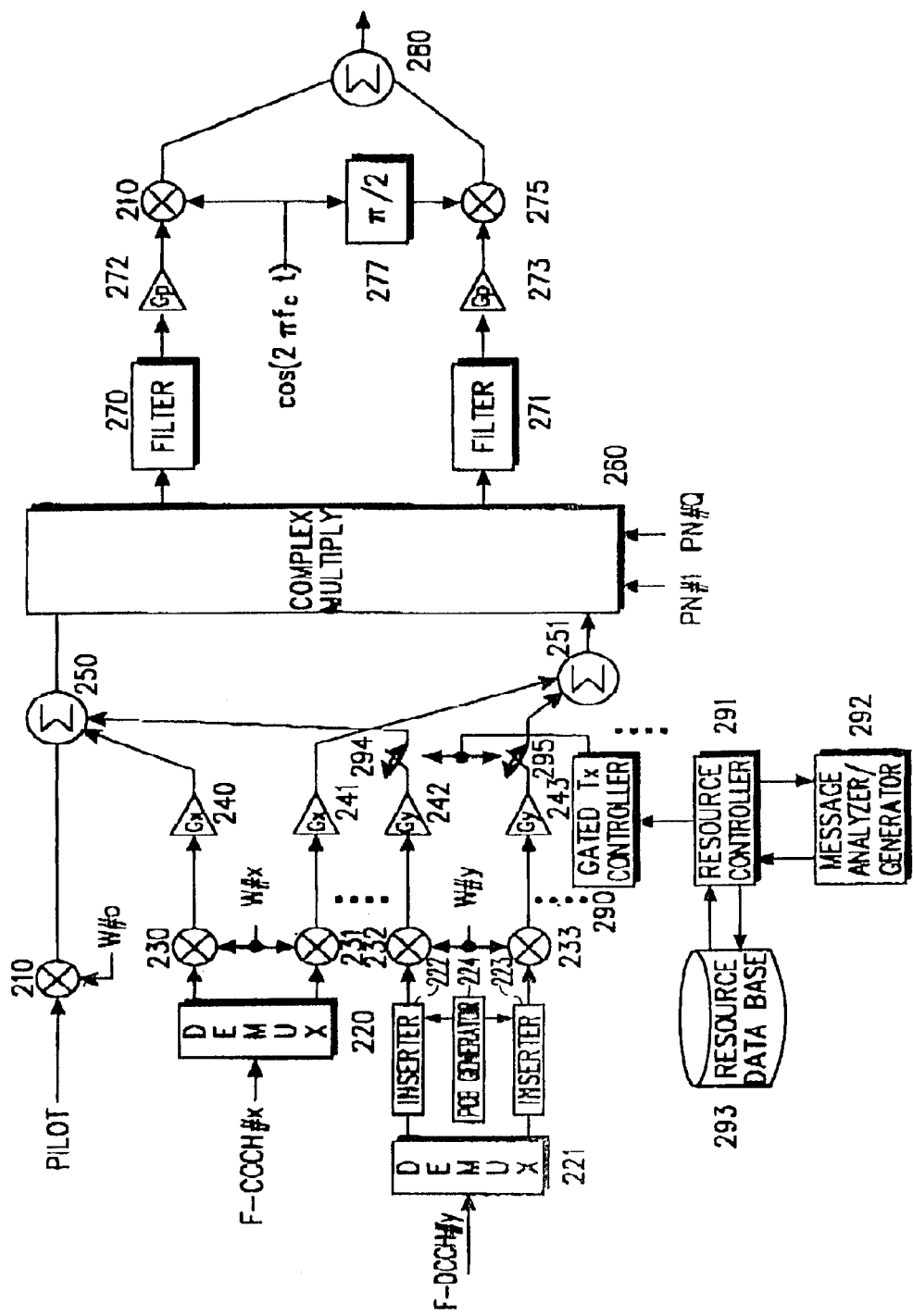
FIG. 5 is a schematic block diagram of a base station transmitter according to the present invention.

FIG. 5 is a schematic block diagram illustrating a base station transmitter according to the present invention. Forward channels for transmitting signals from the base station to the mobile station include a pilot channel which becomes a reference channel for sync acquisition and channel estimation, a forward common control channel (F-CCCH) over which the base station can exchange a control message with every mobile station in the cell controlled by the base station itself, a forward dedicated control channel (F-DCCH) used when the base station exchanges a control message with a specific mobile station, and a forward dedicated traffic channel for transmitting a data message to the mobile station. The forward dedicated traffic channel includes a forward fundamental channel (F-FCH) and a forward supplemental channel (F-SCH).

Referring to FIG. 5, demultiplexers 220 and 221 demultiplex input data, which has sustained channel encoding and interleaving, into an I channel and a Q channel. A serial/parallel converter is typically used for the demultiplexers 220 and 221. A PCB generator 224 generates a power control bit (PCB) for controlling transmission power of the mobile station. An inserter 222 is connected between the I channel output of the demultiplexer 221 and a mixer 232, and inserts the power control bit generated from the PCB generator 224 in the dedicated control channel signal. An inserter 223 is connected between the Q channel output of the demultiplexer 221 and a mixer 233, and inserts the power control bit generated from the PCB generator 224 in the dedicated control channel signal. Although the invention has been described with reference to an embodiment in which the power control bit is inserted in the dedicated control channel, it is also possible to insert the power control bit in other dedicated control channels for the forward link.

A mixer 210 multiplies an input pilot channel signal by an orthogonal code for the pilot channel to orthogonally modulate the pilot channel signal. Further, for spreading and channel identification, mixers 230 and 231 multiply the demultiplexed data output from the demultiplexer 220 by an orthogonal code for the forward common control channel (F-CCCH) to orthogonally modulate the demultiplexed data. For spreading and channel identification, the mixers 232 and 233 multiply the data output from the PCB inserters 222 and 223 by an orthogonal code for the forward dedicated control channel (F-DCCH) to orthogonally modulate the PCB-inserted data. The outputs of the mixers 230, 231, 232 and 233 are gain controlled by their associated gain controllers 240, 241, 242 and 243, respectively, so as to have a value relative to a power level of the forward pilot channel. The outputs of the gain controllers 240–243 are separately applied to summers 250 and 251 according to I and Q channels, respectively, and then summed by the summers 250 and 251. The outputs of the summers 250 and 251 are applied to a complex spreader 260 where they are multiplied by a PN sequence uniquely assigned to the base station, for scrambling. The outputs of the complex multiplier 260 are filtered by filters 270 and 271 according to I and Q channels, respectively, thus generating bandwidth-limited signals. The outputs of the filters 270 and 271 are applied to their associated amplifiers 272 and 273 where they are amplified to have a level sufficient for transmission. Mixers 274 and 275 multiply the outputs of the amplifiers 272 and 273 by a carrier to convert the baseband signals to radio frequency signals. A summer 280 sums the I-channel signal and the Q-channel signal.

Gating elements 294 and 295 are connected between the gain controller 242 and the summer 250 and between the gain controller 243 and the summer 251, respectively, and are switched by a gated transmission controller 290. A switch or a gain controller can be used for the gating elements 294 and 295. When using the gain controller, it is possible to perform the switching function by setting a gain to '0' or '1'. Therefore, the outputs of the gain controllers 242 and 243 for the forward dedicated control channel are gated by the gated transmission controller 290 and the gating elements 294 and 295. The gated transmission controller 290 is directed by a system resource controller 291 as to whether to perform gated transmission, and a message generator/analyzer 292 generates and analyzes a corresponding message for controlling operation of the mobile station. The system resource controller 291 accesses necessary information from a system resource data base 293. The gated transmission controller 290 transmits a reverse power control bit at only the power control group or time slot scheduled with the mobile station, when the forward and reverse dedicated control channels are not activated in the control hold state. When the reverse dedicated control channel is not activated in a normal substate of the control hold state, the gated transmission controller 290 transmits only the reverse power control bit in the forward power control group selected according to a pattern identical to a discontinuous transmission pattern for the reverse pilot channel.

FIG. 5 shows only the transmitter of the base station, and does not show a receiver, for simplicity. In the receiver of the base station, a reverse pilot channel receiver receives the reverse pilot channel signal intermittently transmitted from the mobile station.

Figure 6:
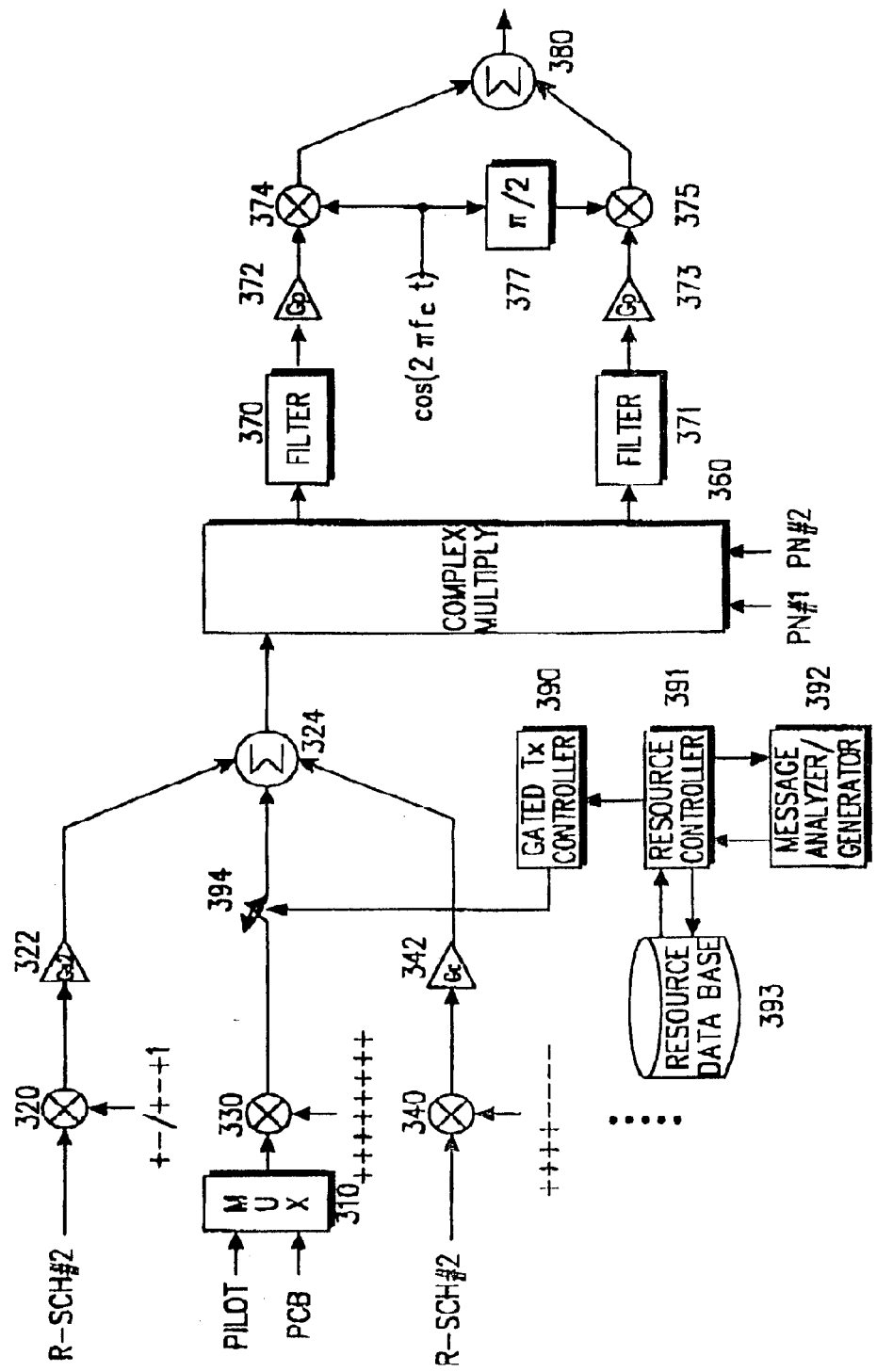
FIG. 6 shows a mobile station transmitter according to the present invention.

FIG. 6 shows a mobile station transmitter according to an embodiment of the present invention. Reverse channels for transmitting signals from the mobile station to the base station include a pilot channel into which a pilot signal (which is a reference channel for sync acquisition and channel estimation) and a forward power control bit (PCB) for forward power control are multiplexed. It also includes a reverse dedicated control channel (R-DCCH) over which the mobile station exchange a control message with the base station managing a cell to which the mobile station belongs, comprised of a reverse fundamental channel (R-FCH) and a reverse supplemental channel (R-SCH).

A multiplexer 310 multiplexes a reverse pilot channel and a forward power control bit. A parallel/serial converter is typically used for the multiplexer 310. A mixer 320 multiplies a reverse supplemental channel signal by an orthogonal code for the supplemental channel to orthogonally modulate the reverse supplemental channel signal. A mixer 330 multiplies an output of the multiplexer 310 by an orthogonal code for the reverse pilot channel to perform orthogonal modulation. A mixer 340 multiplies a reverse dedicated control channel signal by an orthogonal code for the reverse dedicated control channel to perform orthogonal modulation. The mixers 320, 330 and 340 use unique orthogonal codes for maintaining orthogonality among the channels, in order to separate and spread the reverse channels which have experienced channel encoding and interleaving. Gain controllers 322 and 342 controls gains of the mixers 320 and 340, respectively, to control the output value to a value relative to the output of the reverse pilot channel. A summer 324 sums the outputs of the gain controllers 322 and 342 according to I and Q channels. A complex spreader 260 complex spreads the output of the summer 324 with a PN sequence.

The outputs of the complex spreader 360 are passed through filters 370 and 371 according to I and Q channels, thereby generating bandwidth-limited signals. The outputs of the filters 370 and 371 are amplified to a transmission level by amplifiers 372 and 373, respectively. Mixers 374 and 375 multiply the outputs of the amplifiers 372 and 373 by a carrier to convert the baseband signal to the radio frequency signal. A summer 380 sums the I-channel signal and the Q-channel signal.

A gating element 394 is connected between the mixer 330 and the summer 324, and gates the reverse pilot channel under the control of a gated transmission controller 390. A switch can be used for the gating element 394. The gated transmission controller 390 generates a signal for controlling the gating element 394 which gates transmission of the reverse pilot channel in the mobile station transmitter. For operation of the gated transmission controller 390, the mobile station transmitter includes a resource controller 391 for controlling a resource configuration of the mobile station, a message generator/analyzer 392 for generating and analyzing a message for ordering gated transmission, and a resource data base 393 for storing a resource configuration of the mobile station. For sync detection, it is necessary to transmit the reverse pilot channel, so it is not possible to transmit other reverse channels for the duration where transmission of the reverse pilot channel is discontinued.

FIG. 6 shows only the transmitter of the mobile station, and does not show a receiver, for simplicity. In the receiver of the mobile station, a dedicated control channel receiver receives the PCB signal intermittently transmitted from the base station.

Applying the gated transmission of the reverse pilot channel to the future CDMA mobile communication systems requires a method and device for adding the above-stated gated transmission technique to a call processing procedure of the mobile communication system. The following describes performing gated transmission (i) during transition to the active state in the call setup process, (ii) during transition from the active state to the control hold state and during transition from the control hold state to the active state, and (iii) during the control hold state, in a CDMA communication system according to an embodiment of the present invention.

Figure 7:
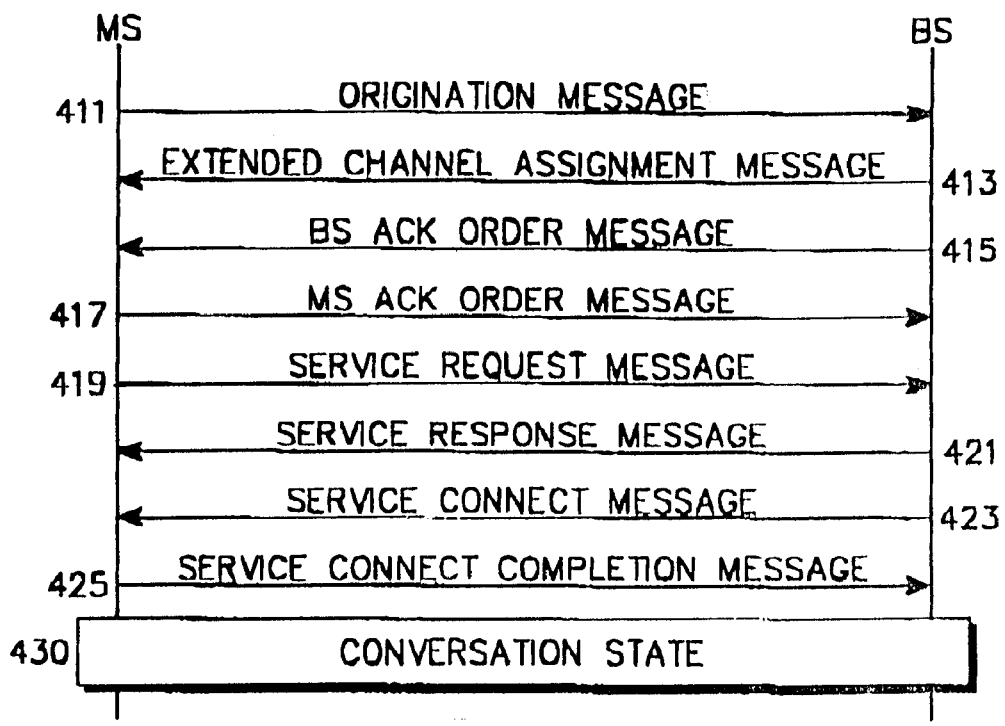
FIG. 7 shows a negotiating procedure for gated transmission in a CDMA mobile communication system according to the present invention, where the mobile station makes a first request.

FIG. 7 shows a negotiating procedure for gated transmission in a CDMA mobile communication system according to an embodiment of the present invention, wherein the mobile station first makes a negotiation request. When there is data to transmit, the mobile station transmits an origination message in step 411. Upon receipt of this message, the base station (BS) transmits an extended channel assignment message to the mobile station (MS) in step 413. Here, the extended channel assignment message can assign either the dedicated control channel or the fundamental channel. In particular, if there is no available Walsh code when assigning the dedicated control channel, the base station transmits the message along with a quasi-orthogonal code index. In steps 415 and 417, the base station and the mobile station acknowledge transmission and reception of the channel assignment message.

Thereafter, even though the base station does not approve the service negotiation, the mobile station transmits a service request message in step 419, in order to make a negotiation on a gating parameter. If the gating parameter transmitted from the mobile station is not acceptable, the base station transmits a service response message along with a rejecting parameter or the other proposed parameter, in step 421. At this time, the base station sets an actual gating rate field to '11' before transmission. Upon receipt of the service response message from the base station, the mobile station examines the field and then repeats the step 419. On the other hand, if the gating parameter received from the mobile station is acceptable, the base station transmits a service connect message in step 423. At this point, an actual gating parameter to be used between the mobile station and the base station is written in the actual gating rate field before transmission.

Upon receipt of the service connect message in step 423, the mobile station completes all the negotiation on the gating parameter and in step 425, transmits to the base station a service connection completion message indicating that the mobile station is ready to enter a conversation state. After completion of the above procedure, the base station and the mobile station enter the conversation state in step 430.

Figure 8:
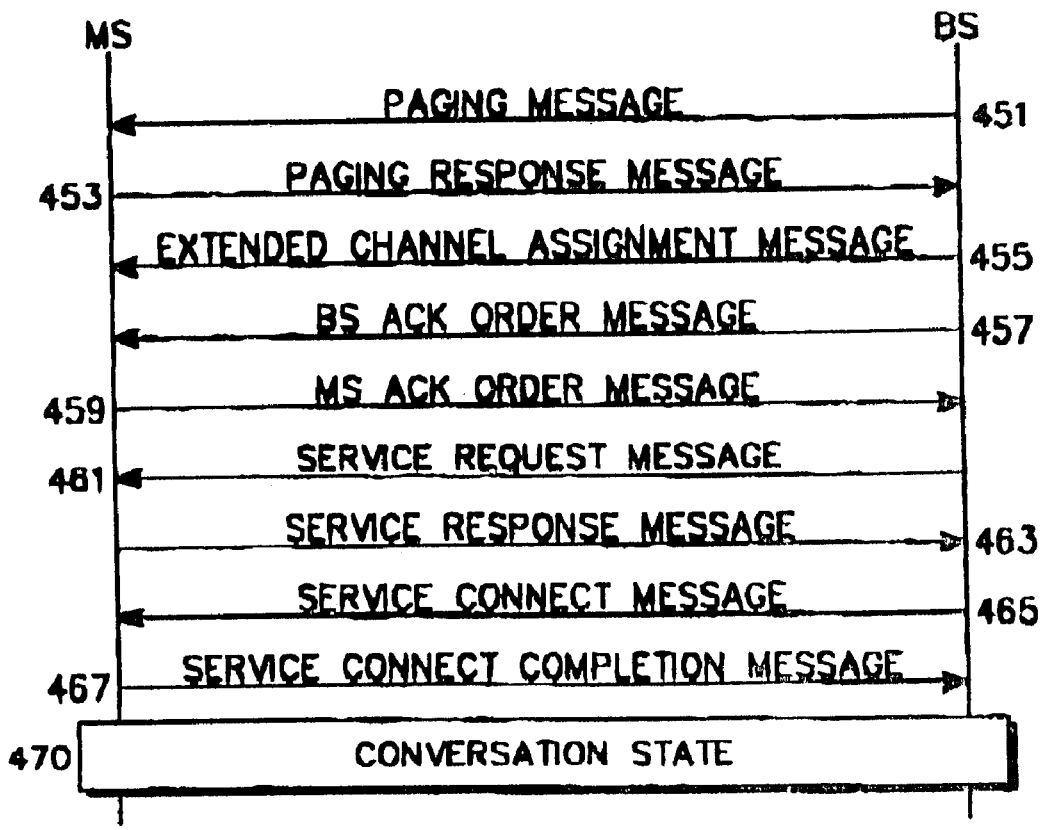
FIG. 8 shows a negotiating procedure for gated transmission in a CDMA mobile communication system according to the present invention, where the base station makes a first request.

FIG. 8 shows a negotiating procedure for gated transmission in a CDMA mobile communication system according to an embodiment of the present invention, wherein the base station first makes a negotiation request.

Referring to FIG. 8, when there is data to transmit, the base station transmits a paging message to the mobile station in step 451. In answer to the message, the mobile station transmits a paging response message in step 453. The base station then transmits an extended channel assignment message in step 455. Thereafter, the base station transmits a response message (BS Ack Order Message) in step 457, and the mobile station transmits a response message (MS Ack Order Message) in step 459.

Thereafter, in step 461, the base station transmits a gating parameter. At this point, the base station transmits a service request message along with a service configuration information record, in order to make a negotiation on the gating parameter. The actual gating rate field is set to "11" and a gating rate is set to a value acceptable to the base station, before transmission. Upon receipt of the service request message, the mobile station transmits a service response message in step 463. If the proposed values are acceptable, the service response message indicates acceptance of the gating rate in step 463. However, if the proposed parameter from the base station is not acceptable, the mobile station transmits the service response message by adding a rejection field of a proposal field.

Upon receipt of the service response message, if it is judged that the mobile station accepts the proposed parameter, the base station writes a gating rate to be actually used by the mobile station in the actual gating rate field of a service connect message and then transmits the service connect message, in step 465. The mobile station then transmits a service connection completion message indicating that all the negotiation on the gating parameter has been completed, in step 467, and then enter the conversation state (or the active state) in step 470. However, upon receipt of a service response message indicating that the mobile station cannot accept the proposed gating parameter, the base station repeats the step 461, and the negotiation on the gating parameter will be made again between the base station and the mobile station.

Description is now made of a format of the origination message of FIG. 7. Other fields constituting the origination message are identical to those of the IS-95B origination message, and the fields mentioned below are added at the end of the existing-message. A CH_IND_INCL field indicates whether or not a CH_IND field for indicating a channel is included in the origination message. When the CH_IND_INCL field has a value '0', the CH_IND field is not included. When the CH_IND_INCL field has a value '1', the CH_IND field is included. When the CH_IND field has a value '1', it means that a fundamental channel is required; when the CH_IND field has a value '2', it means that a dedicated control channel is required; and when CH_IND field has a value '3', it means that both the fundamental channel and the dedicated control channels are required. The paging message of FIG. 8 has the same format as the existing IS-95B paging message, and includes fields identical to those added at the end of the origination message described above, the fields having the same meaning as those of the origination message. Table 1 below shows the fields added to the origination message and the paging message.

TABLE 1

| Field | Length (bits) |
| --- | --- |
| CH_IND_INCL | 1 |
| CH_IND | 0 or 2 |

The extended channel assignment message of FIGS. 7 and 8 has a format of the IS-95B extended channel assignment message, to which a dedicated control channel assignment function is added. The BS ACK (acknowledge) order message, the MS ACK order message, the service connect message and the service connection completion message of FIGS. 7 and 8 have the same format as the corresponding IS-95B messages. The service request message 419, 461 and the service response message 421, 463 of FIGS. 7 and 8 are formatted as in the corresponding IS-95B messages, but they have gating-related information in a service configuration table as follows. A GATING_RATE_INCL field indicates whether a gating function-related field is included or not; when it is '0', it indicates that the gating-related information is not included, and when it is '1', it indicates that the gating-related information is included. A GATING_RATE_SET field indicates a gating rate set supported by the party sending the message ("message originating party"). Table 2 below shows the fields added to the service configuration table of the service request message and the service response message.

TABLE 2

| Type Specific Field | Length (bits) |
| --- | --- |
| GATING_RATE_INCL | 1 |
| GATING_RATE_SET | 0 or 3 |
| PILOT_GATE_RATE | 0 or 2 |

In addition, Table 3 below shows details of the GATING_RATE_SET field of Table 2.

TABLE 3

| GATING_RATE_SET (Binary) | Supported Gating Rate |
| --- | --- |
| 000 | Continuous Tx (1) |
| 001 | Continuous and 1/2 Tx Supported |

TABLE 3-continued

| GATING_RATE_SET (Binary) | Supported Gating Rate |
| --- | --- |
| 010 | Continuous and 1/4 Tx Supported |
| 011 | Continuous, 1/2 and 1/4 Tx Supported |

Other values are reserved for extension

A PILOT_GATE_RATE field of Table 2 indicates a gating rate that the message originating party desires to use, and the details of it are shown in Table 4 below.

TABLE 4

| PILOT_GATE_RATE (Binary) | Supported Gating Rate |
| --- | --- |
| 00 | Continuous Tx (1) |
| 01 | 1/2 Tx |
| 10 | 1/4 Tx |

The other value is reserved for extension

The above gating operation can be divided into an operation in a P2 mode and an operation in a P3 mode. The P2 mode has a gating-on process and a gating-off process. Further, the gating-off process is divided into the case where the mobile station starts the process and the case where the base station starts the process. The P3 mode also has a gating-on process and a gating-off process. Similarly, the gating-off process is divided into a case where the mobile station starts the process and another case where the base station starts the process.

Actual message exchange between signaling layers is performed through a physical layer. However, for convenience, it is expressed as if the message is directly exchanged between the signaling layers.

Figure 9:
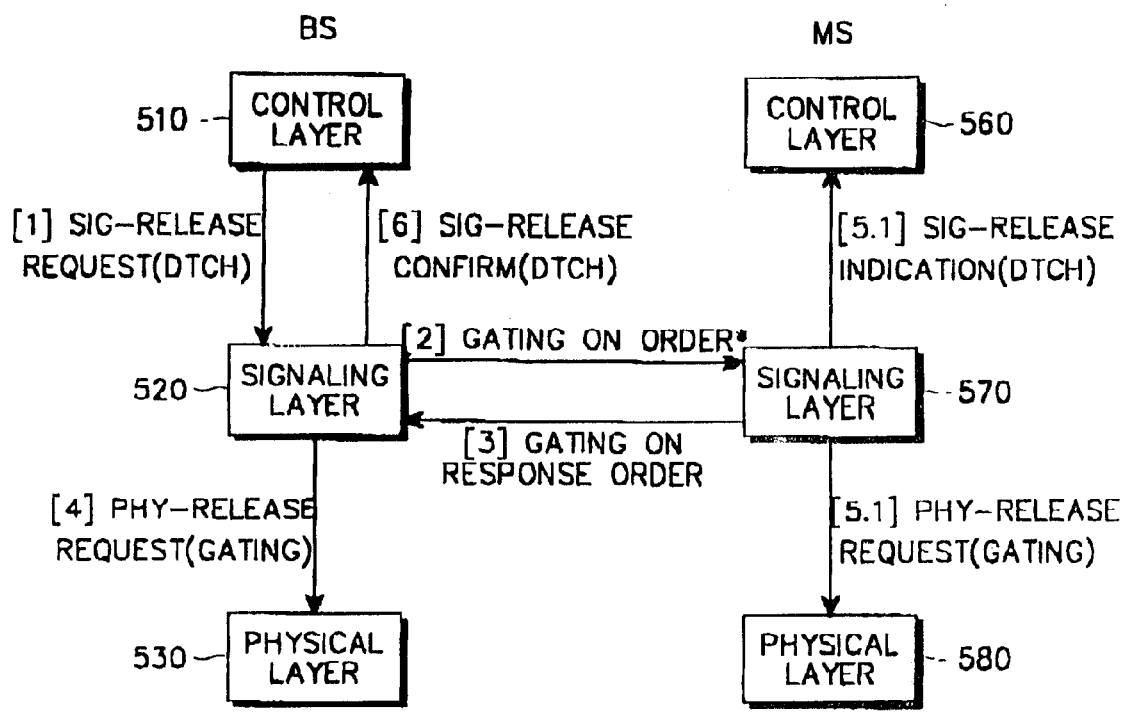
FIG. 9 shows a procedure in which the base station starts the gating-on process in the P2 mode in a mobile communication system according to the present invention.

FIG. 9 shows a procedure in which the base station starts the gating-on process in the P2 mode in a mobile communication system according to an embodiment of the present invention.

Referring to FIG. 9, when it is detected that there is no user data to transmit, the control layer 510 of the base station sends a dedicated traffic channel (dtch) release request control primitive, SIG-RELEASE_REQUEST(DTCH), to the signaling layer 520. Upon receipt of the release request, the signaling layer of the base station 520 transmits a gating on order message to the signaling layer of the mobile station 570. The mobile station then transmits a gating on response order message to the signaling layer of the base station 520. After transmitting the message, the mobile station sends a gating on control primitive, PHY-RELEASE REQUEST (GATING), to the physical layer of the mobile station 580. Upon receipt of the gating on response order message, the base station also sends a gating-on control primitive, PHY-RELEASE REQUEST(GATING), to the physical layer of the base-station 530 and a dedicated channel (dtch) release confirm control primitive, SIG-RELEASE CONFIRM (DTCH), to the control layer of the base station 510.

The base station and the mobile station should have the same gating-on time. To this end, upon receipt of the gating order response message, the base station immediately starts the gating-on process, and the mobile station starts the gating-on process after a lapse of a predetermined waiting time after sending the gating order response message. Preferably, the waiting time is a variable depending on the system condition. Such an operation of synchronizing the gating time is applied equally to every process described below.

After completion of all the processes, the signaling layer 520 of the base station sends the control layer 510 a control primitive indicating that releasing the dedicated traffic channel has been completed. Further, the mobile station sends the control layer 560 the control primitive indicating that the dedicated traffic channel is released. Through this procedure, the control layers 510 and 560 of the base station and the mobile station complete a transition to the control hold state where only transmission of control signal is permitted and transmission of the user data is not permitted.

Figure 10:
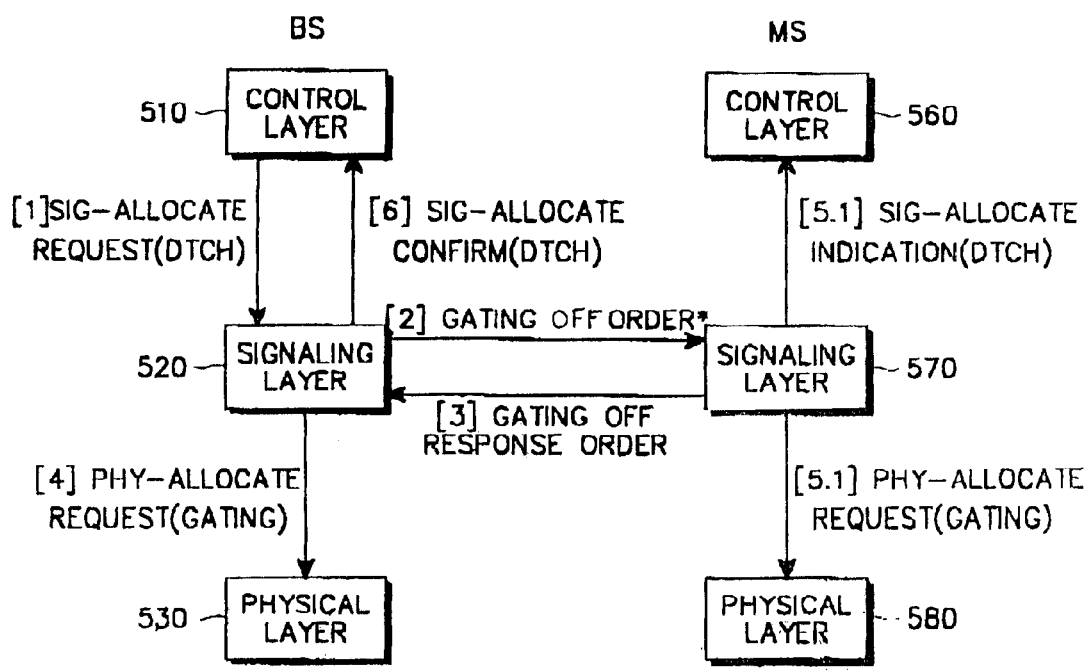
FIG. 10 shows a procedure in which the base station starts the gating-off process in the P2 mode in a mobile communication system according to the present invention.

FIG. 10 shows a procedure in which the base station starts the gating-off process in the P2 mode in a mobile communication system according to an embodiment of the present invention.

Referring to FIG. 10, when there is user data to transmit, the control layer 510 of the base station (BS) sends a dedicated traffic channel establishment request message to the BS signaling layer 520. The BS signaling layer 520 then starts the gating-off process prior to establishment of the dedicated traffic channel. For the gating-off process, the BS signaling layer 520 transmits a gating-off order message to the signaling layer of the mobile station (MS). Upon receipt of this message, the mobile station transmits a gating-off response message to the base station.

Further, after transmitting the gating-off response message, the mobile station sends a gating-off order, a control primitive, to the MS physical layer 580. Upon receipt of the gating-off response message, the base station also sends a gating-off order, a control primitive, to the BS physical layer 530. After completion of all the processes, the BS signaling layer 520 sends the BS control layer 510 a control primitive indicating that establishment of the dedicated traffic channel has been completed. Further, the mobile station sends the MS control layer 560 a control primitive indicating that the dedicated traffic channel is established. Through this procedure, the base station and the mobile station complete a transition to the active state where it is possible to transmit user data.

Figure 11:
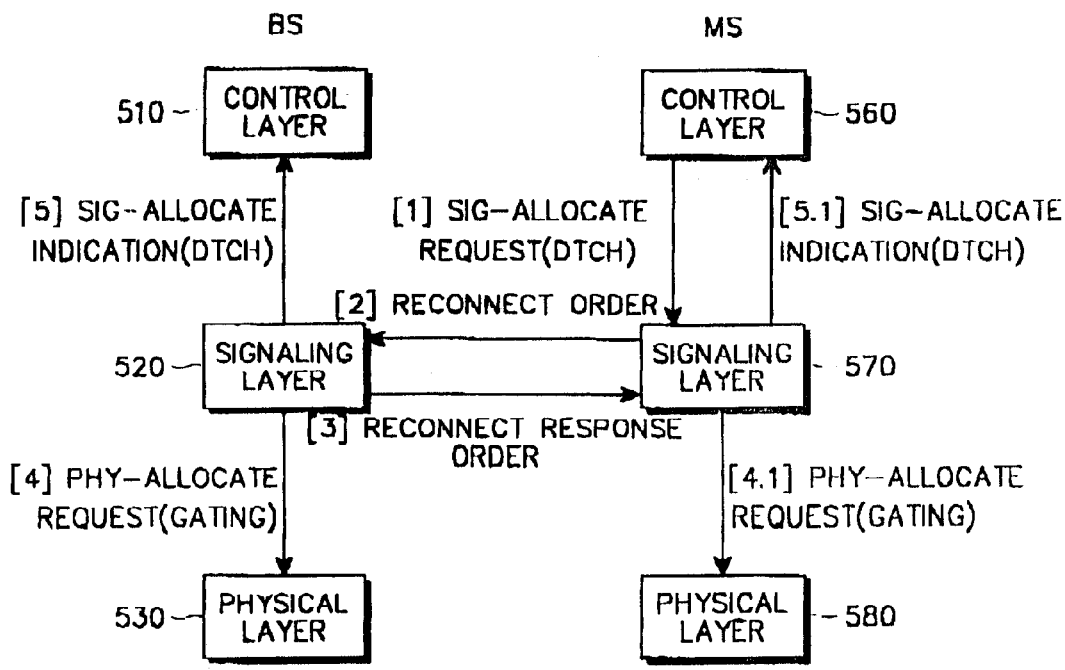
FIG. 11 shows a procedure in which the mobile station starts the gating-off process in the P2 mode in a mobile communication system according to the present invention.

FIG. 11 shows a procedure in which the mobile station starts the gating-off process in the P2 mode in a mobile communication system according to an embodiment of the present invention.

Referring to FIG. 11, when there is user data to transmit, the MS control layer 560 sends a dedicated traffic channel establishment request, a control primitive, to the MS signaling layer 570. The MS signaling layer 570 then sends a reconnect order message to the signaling layer of the base station.

Upon receipt of this message, the base station transmits a reconnect response order message in reply to the received message. At this point, the base station sends a gating-off order, a control primitive, to the BS physical layer 530. Thereafter, the base station transmits to the BS control layer 510 a message indicating that the dedicated traffic channel for transmitting user data has been completely established. Upon receipt of the reconnect response order message, the mobile station sends a gating-off order, a control primitive, to the MS physical layer 580. Thereafter, the mobile station transmits to the MS control layer 560 a signal allocate indication, a control primitive informing that the dedicated traffic channel is established. Through this procedure, the mobile station and the base station complete a transition from the control hold state to the active state.

Figure 12:
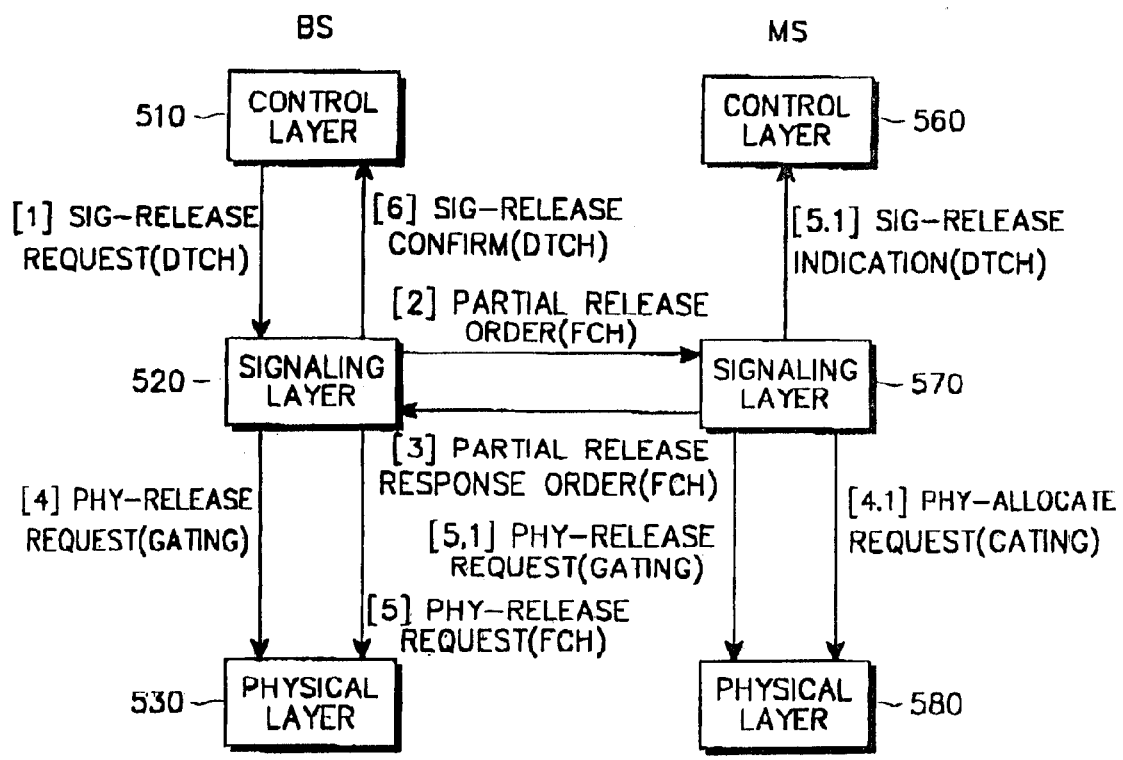
FIG. 12 shows a procedure in which the base station starts the gating-on process in the P3 mode in a mobile communication system according to the present invention.

FIG. 12 shows a procedure in which the base station starts the gating-on process in the P3 mode in a mobile communication system according to an embodiment of the present invention.

Referring to FIG. 12, when there is no user data to transmit for a predetermined time in the active state, the control layer 510 of the base station transmits a dedicated traffic channel release request, a control primitive, to the signaling layer 520. The BS signaling layer 520 then starts releasing the fundamental channel in order to release the dedicated traffic channel BS. The signaling layer 520 transmits a partial release order message to the mobile station, specifying that the fundamental channel is to be released. Upon receipt of this message, the mobile station transmits a partial release response order to the base station. After transmitting the response message, the mobile station sends a gating-off order message and a fundamental channel release order to the MS physical layer 580. After sending the orders, the mobile station sends the MS control layer 560 a signal release.indication, a control primitive informing that the logical dedicated traffic channel has been released. Upon receipt of the partial release response order, the base station sends the BS physical layer 530 a fundamental channel release order message and a gating-on order message. Thereafter, the base station sends the control layer 510 a signal release confirm, a control primitive informing that the dedicated traffic channel has been completely released. Through this procedure, the base station and the mobile station completes a transition from the active state to the control hold state in the P3 mode.

Figure 13:
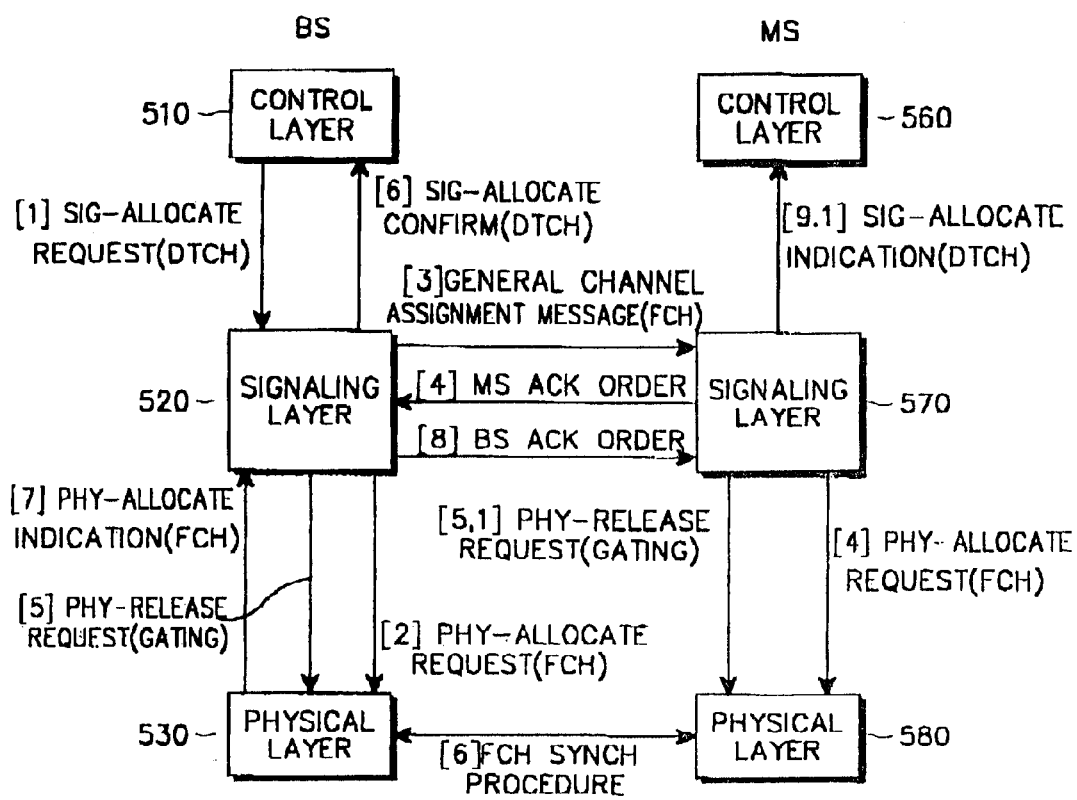
FIG. 13 shows a procedure in which the base station starts the gating-off process in the P3 mode in a mobile communication system according to the present invention.

FIG. 13 shows a procedure in which the base station starts the gating-off process in the P3 mode in a mobile communication system according to an embodiment of the present invention.

Referring to FIG. 13, when there is data to transmit, the control layer 510 of the base station transmits a dedicated traffic channel establishment request to the signaling layer 520. In the P3 mode, since there is required a fundamental channel in order to establish the logical dedicated traffic channel, the BS signaling layer 520 sends a fundamental channel establishment order to the BS physical layer 530, and then transmits to the MS signaling layer 570 a general channel assignment message informing establishment of the fundamental channel. The general channel assignment message is transmitted over the dedicated control channel.

Upon receipt of this message, the mobile station sends a fundamental channel assignment order to the MS physical layer 580 and sends an MS ACK order message to the base station in reply to the received general channel assignment message. After transmitting the message, the mobile station sends a gating-off order to the MS physical layer 580. Upon receipt of the MS ACK order message, the base station also sends a gating-off order, a control primitive, to the BS physical layer 530. When establishing the fundamental channel between the base station and the mobile station is completed, the base station informs the situation to the mobile station through a BS ACK order message. Thereafter, the signaling layer 520 of the base station informs the BS control layer 510 that the logical dedicated traffic channel is completely established. Upon receipt of the BS ACK order message, the mobile station also informs the MS control layer 560 that the logical dedicated traffic channel is completely established. Through this procedure, the base station and the mobile station completes a transition from the control hold state to the active state.

Figure 14:
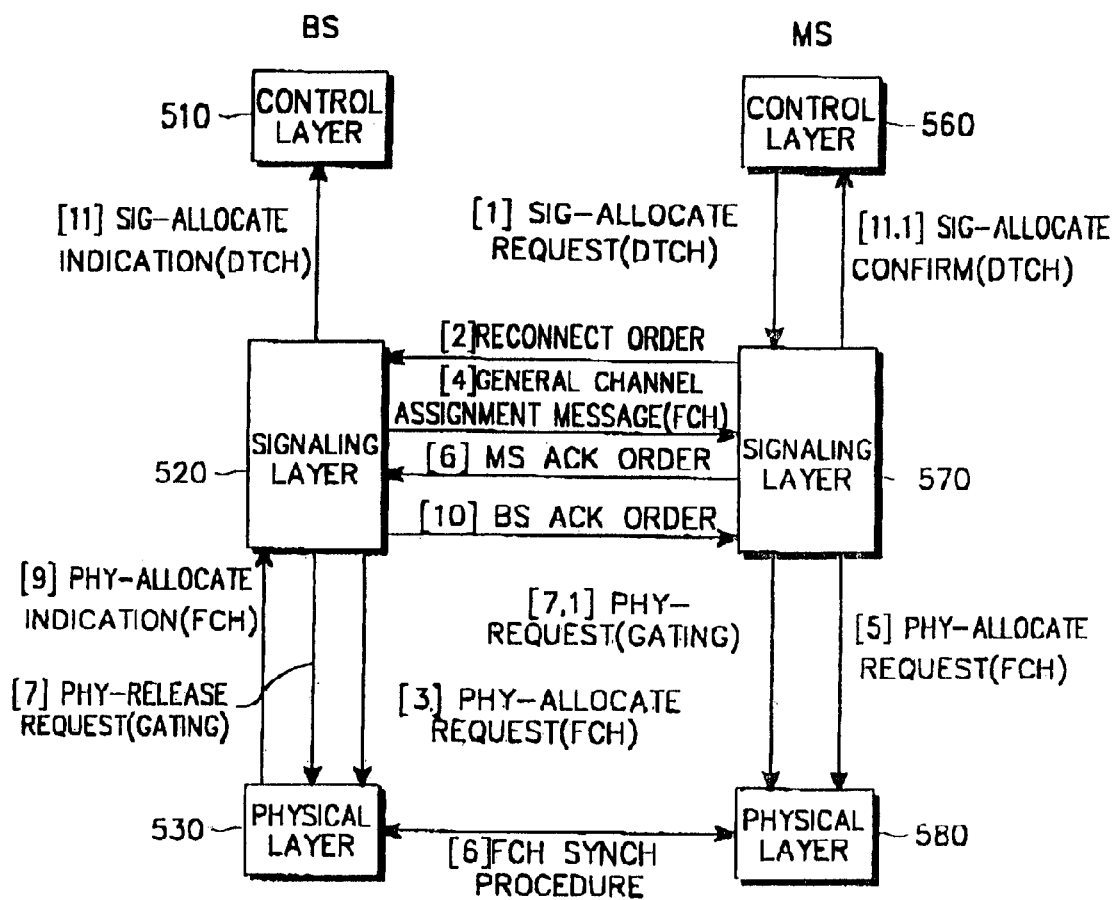
FIG. 14 shows a procedure in which the mobile station starts the gating-off process in the P3 mode in a mobile communication system according to the present invention.

FIG. 14 shows a procedure in which the mobile station starts the gating-off process in the P3 mode in a mobile communication system according to an embodiment of the present invention.

Referring to FIG. 14, when there is data to transmit, the control layer 560 of the mobile station sends a dedicated traffic channel establishment request to the signaling layer 570. The signaling layer 570 of the mobile station then transmits a reconnect order message to the base station, specifying that a requested channel is the fundamental channel. Upon receipt of this message, the base station sends a fundamental channel establishment order to the BS physical layer 530 and then, transmits a general channel assignment message to the mobile station. At this point, the base station specifies in the general channel assignment message that the established channel is the fundamental channel. The subsequent process is similar to the gating-off process started by the base station in the P3 mode The partial release order message, the reconnect order message, the gating-on order message and the gating-off order message used for the gating operation, are acquired by additionally defining an order qualification code (ORDQ) field to the IS-95B order messages. Table 5 below shows the ORDQ field added to an order message for the reverse link, and Table 6 shows the ORDQ field added to an order message for the forward link.

TABLE 5

| r-csch Order | r-dsch Order | Order Code, ORDER (binary) | Order Qualification Code, ORDQ (binary) | More Fields other than ORDQ | Support Req'd | Name/ Function |
|---|---|---|---|---|---|---|
| Y | Y | 100001 | 00000000 | Y | Y | Partial Release Order (to order the BS to release the resources as specified in the order-specific fields] |
| Y | Y | 100010 | 00000000 | N | Y | Partial Release Response Order [response to the order from BS to release resources] |
| Y | Y | 100011 | 00000000 | Y | Y | Reconnect Order [to request the base station to connect one or more channels] |
| N | Y | 100100 | 00000000 | N | Y | Gating-on Request Order |
| N | Y | 100100 | 00000001 | N | Y | Gating-off Request Order |

TABLE 6

| f-csch Order | f-dsch Order | Order Code, ORDER (binary) | Order Qualification Code, ORDQ (binary) | ACTION_TIME can be specified | Additional Fields other than ORDQ | Name/ Function |
|---|---|---|---|---|---|---|
| Y | Y | 100000 | 00000000 | Y | Y | Partial Release Order (to order the MS to release the resources as specified in the order-specific fields] |

TABLE 6-continued

| f-csch Order | f-dsch Order | Order Code, ORDER (binary) | Order Qualification Code, ORDQ (binary) | ACTION_TIME can be specified | Additional Fields other than ORDQ | Name/ Function |
|---|---|---|---|---|---|---|
| Y | Y | 100001 | 00000000 | N | N | Partial Release Response Order |
| N | Y | 100010 | 00000000 | N | N | Gating-on Order |
| N | Y | 100010 | 00000001 | N | N | Gating-off Order |

First Exemplary Embodiment

A detailed description is given below regarding an operation of performing gated transmission in the control hold state according to a first embodiment of the present invention.

In this embodiment, the base station and the mobile station determine a gating rate in the call setup process, and during a transition to the control hold state, make a negotiation on the gating rate so as to determine a gating rate proper for the present radio environment. Then, at the determined gating rate, the base station gates the transmission signal on the forward dedicated control channel and the mobile station gates the transmission signal on the reverse pilot channel.

Figure 15:
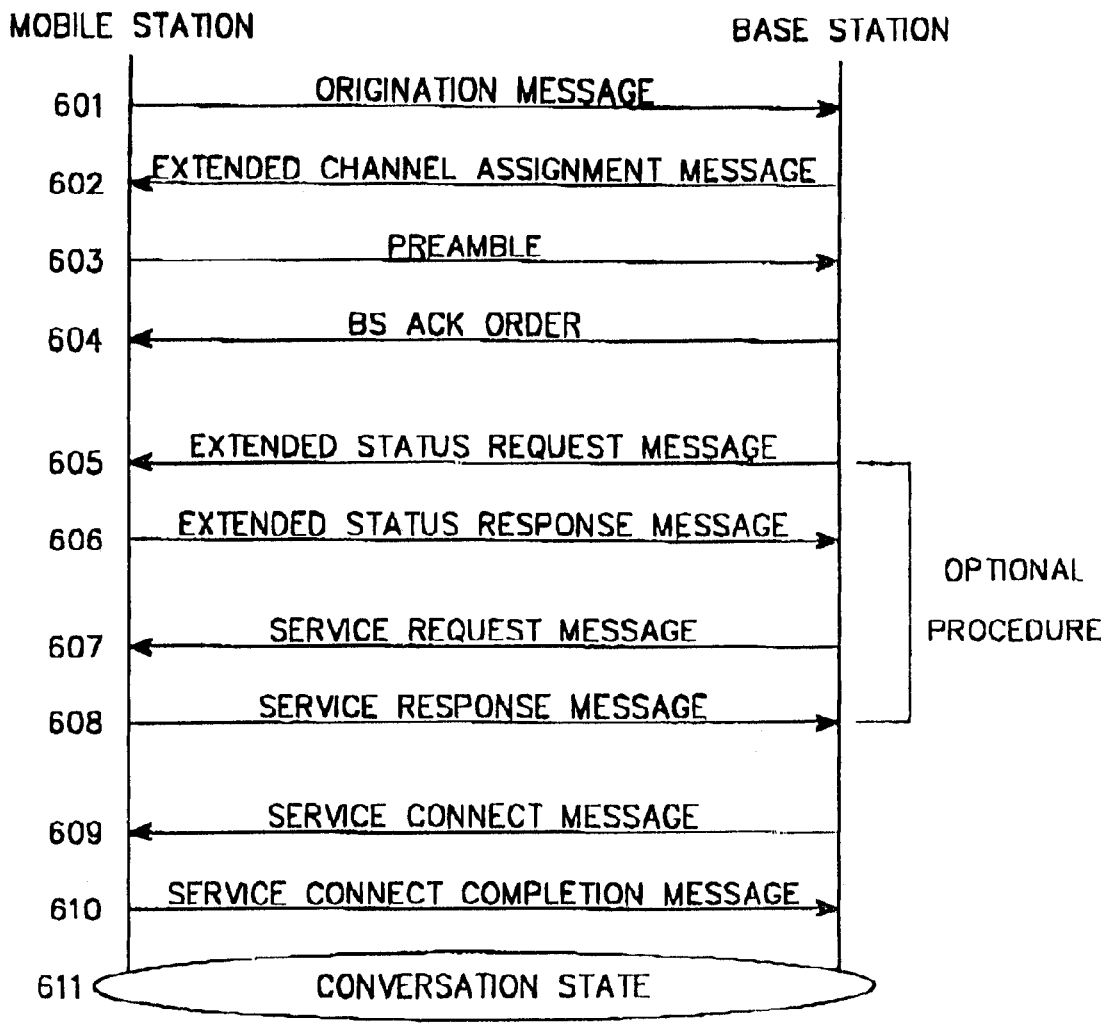
FIG. 15 shows a call processing procedure in a CDMA mobile communication system, in which the mobile station requests a call.

FIG. 15 shows a call processing procedure in a CDMA mobile communication system, in which the mobile station requests a call.

Referring to FIG. 15, in step 601, the mobile station transmits an origination message (i.e., a reverse control message requesting assignment of a dedicated control channel to the mobile station) over a reverse access channel (R-ACH) which is a reverse common channel. Upon receipt of the origination message, the base station transmits an extended channel assignment message over a forward access channel (F-ACH) in step 602, and simultaneously starts transmitting null traffic over a channel having a corresponding orthogonal code. Upon receipt of the extended channel assignment message, the mobile station analyzes a null frame received over the corresponding channel to determine whether the channel is normally established. When it is determined that the channel is normally established, the mobile station transmits a preamble over a channel for spreading a generated long code with a unique code of the mobile station, in step 603. In this step the preamble is transmitted to synchronize the mobile station to the base station during channel assignment. When assignment of the dedicated channel is performed bi-directionally as stated above, the base station transmits a response message (i.e., BS ACK order message) in step 604, and the mobile station then stops transmission of the preamble and can transmit a message over the dedicated traffic channel.

Thereafter, in step 605, the base station transmits an extended status request message to detect the mobile station's capability (i.e., available services capabilities). Upon receipt of this message, the mobile station sends an extended status response message including the mobile station's capability information in step 606. Based on this information, it is possible to use the available service. The information transmitted from the mobile station to the base station may include various additional capability information concerning the packet service.

Based on the above information, a service negotiation based on the presently available transmission capabilities is made between the base station and the mobile station in steps 607 to 610, in order to provide a service having a quality required by the user. After completion of the service negotiation between the base station and the mobile station, it is possible to provide the service.

A field indicating whether or not the reverse pilot channel is available for gated transmission is added to the information transmitted from the mobile station to the base station in step 606. Further, in the service negotiation process performed in steps 607 to 610, a service configuration record is exchanged, to which gated transmission-related fields are added. The gated transmission-related configuration record is shown in Table 7 below.

TABLE 7

| Type-specific Field | Length (Bit) |
|---|---|
| FOR_MUX_OPTION | 16 |
| REV_MUX_OPTION | 16 |
| FOR RATES | 8 |
| REV_RATES | 8 |
| NUM_CON_REC | 8 |

NUM_CON_REC field indicates occurrences of the following record.

| | |
|---|---|
| RECORD_LEN | 8 |
| CON_REF | 8 |
| SERVICE_OPTION | 16 |
| FOR_TRAFFIC | 4 |
| REV_TRAFFIC | 4 |
| GATING_RATE_INCL | 1 |
| PILOT_GATING_RATE | 0 or 2 |
| FCH_CC_INCL | 1 |
| FOR_FCH_RC | 0 or 5 |
| REV_FCH_RC | 0 or 5 |
| FCH-FRAME_SIZE | 0 or 1 |
| DCCH_CC_INCL | 1 |
| FOR_DCCH_RC | 0 or 5 |
| REV_DCCH_RC | 0 or 5 |
| DCCH_FRAME_SIZE | 0 or 2 |
| FOR_SCH_CC_INCL | 1 |
| NUM_FOR_SCH | 0 or 3 |

NUM_FOR_SCH indicates occurrences of the following record.

| | |
|---|---|
| FOR_SCH_ID | 2 |
| FOR_SCH_CC Type_specific fields | See 3.7.5.7.1 |
| FOR_SCH_OPTION | 16 |
| REV_SCH_CC_INCLUDED | 1 |
| NUM_REV_SCH | 0 or 3 |
| REV_SCH_ID | 2 |
| REV_SCH_CC Type_specific fields | See 3.7.5.7.1 |
| REV_SCH_MUX_OPTION | 16 |
| RESERVED | 0–7 (as needed) |

Desired Reverse Pilot Gating Rate

| PILOT_GATING_RATE field (binary) | Description |
|---|---|
| 00 | Gating Rate 1 |
| 01 | Gating Rate 1/2 |
| 10 | Gating Rate 1/4 |
| 11 | Reserved |

The message fields shown in Table 7 indicate the service configuration record which is used in the service negotiation procedure during call setup in a mobile communication system. In Table 7, the GATING_RATE_INCL field and the PILOT_GATING_RATE field are added for gated transmission. The GATING_RATE_INCL field indicates whether the PILOT_GATING_RATE field is included or not in the service configuration record, and indicates whether the reverse pilot channel is supported or not. In addition, the PILOT_GATING_RATE field is required when making a negotiation on the gating rate to be used during actual gated transmission. When the gating rate is determined as ½ through the negotiation, the gating rates 1 and ½ are all available during actual gated transmission. When the gating rate is determined as ¼ through the negotiation, the gating rates 1, ½ and ¼ are all available during actual gated transmission.

Figure 16:
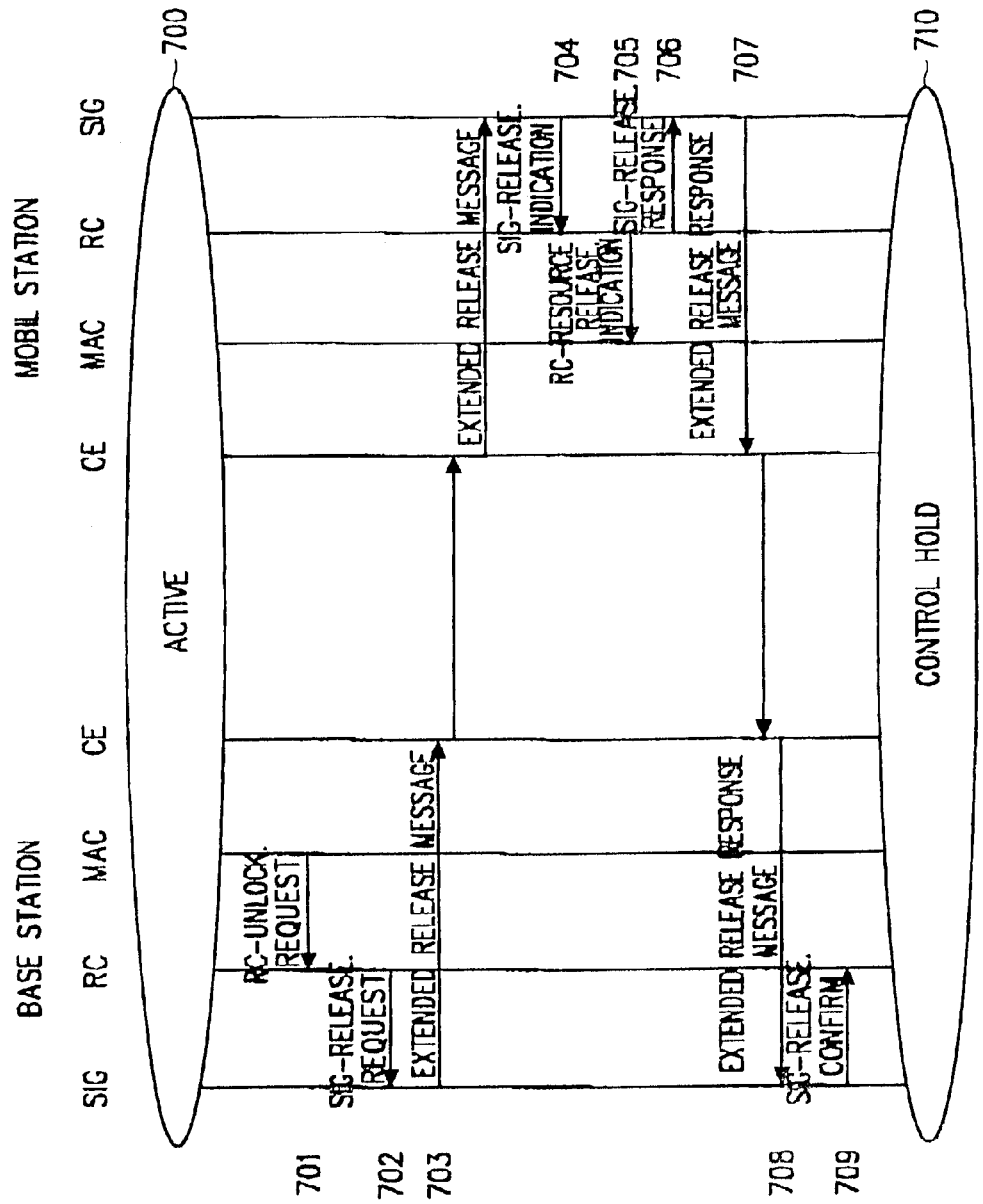
FIG. 16 shows a call processing procedure required during a transition from the active state to the control hold state in the case where a MAC (Medium Access Control) layer is added during packet data service in a CDMA mobile communication system according to a first embodiment of the present invention.

FIG. 16 shows a call processing procedure required during a transition from the active state to the control hold state in the case where a MAC (Medium Access Control) layer is added during packet data service in a CDMA mobile communication system.

In FIG. 16, SIG denotes a layer for generating and analyzing a call processing-related message, and RC (Resource Controller) denotes a virtual module for maintaining and controlling a status of every type of physical and logical resources related to the service. With regard to the RC, only the base station's RC performs active control (assignment and release of the resources), and the mobile station's RC performs a command from the base station. The MAC layer includes a state transition module classified on the basis of the non-transmission period in performing the packet data service, and has the function of triggering state transition-related operations. In addition, CE refers to a module for performing every physical operation (encoding, modulation and demodulation) required when transmitting a signal.

Referring to FIG. 16, when the non-transmission period exceeds a time $T\_{Active}$ or when a state transition is required by the system, the MAC layer transmits to the resource controller (RC) an RC-unlock.request message for requesting a transition from the active state to the control hold state, in step 701. Upon receipt of a corresponding primitive from the MAC layer, the RC transmits a SIG-release.request information to the SIG in step 702. Upon receipt of a parameter indicating a transition to the control hold state, the SIG transmits an extended release message to the mobile station through a physical channel configuration element (CE) in step 703.

Then, upon receipt of the extended release message, the SIG of the mobile station transmits SIG-release.indication information to the RC in step 704. Thereafter, in step 705, the RC sends RC-resource release.indication information to the MAC so as to order the state transition. Further, in step 706, the RC sends SIG-release response information to the SIG. The SIG then transmits an extended release response message to the base station through the physical channel configuration element CE, in step 707. Upon receipt of the extended release response message in step 708, the SIG of the base station transmits SIG-release.confirm information to the RC in step 709, thereby completing the state transition.

The call processing procedure performed in FIG. 16 makes a state transition not including the gated transmission.

Figure 17:
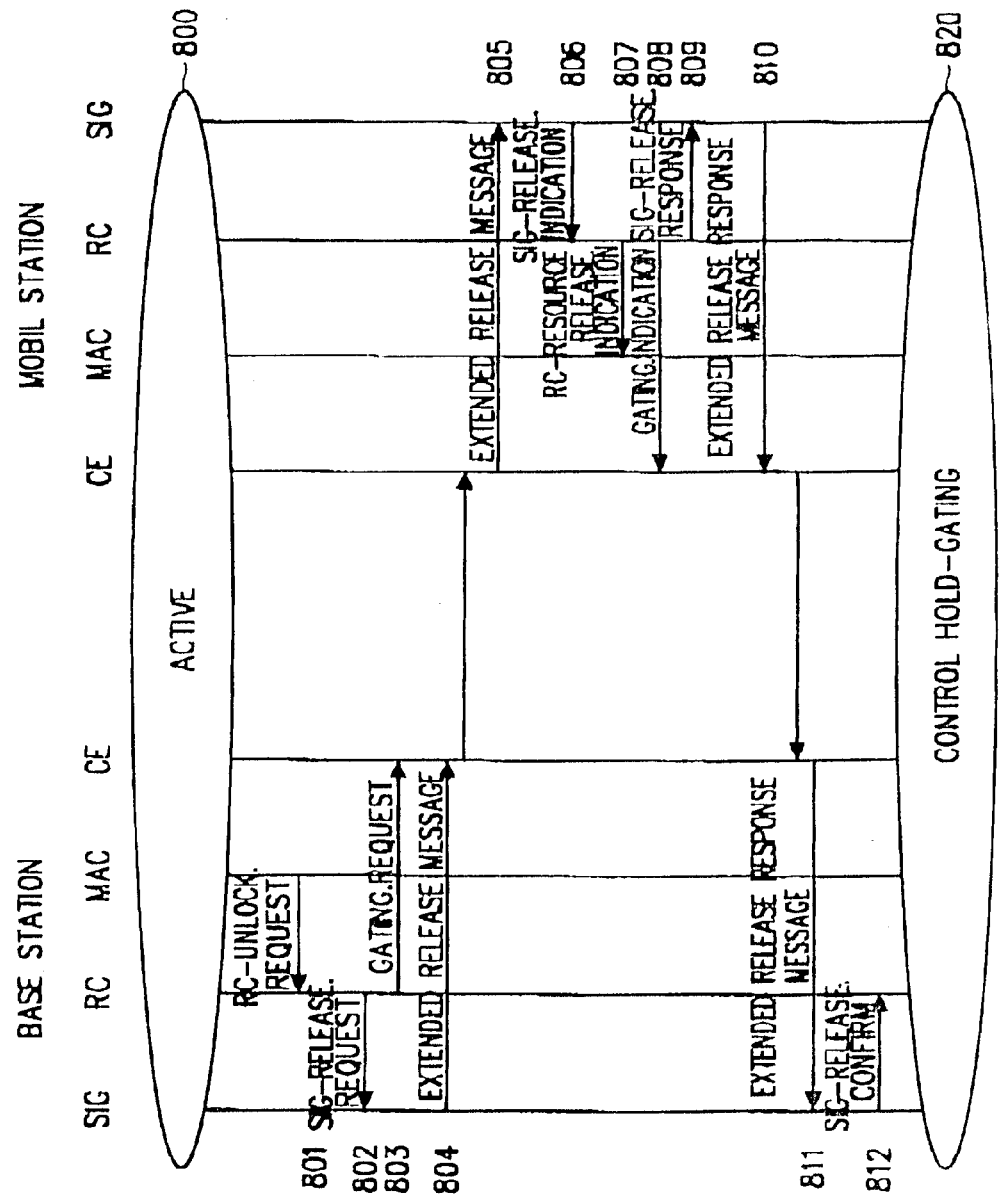
FIG. 17 shows a state transition including gated transmission of a reverse pilot channel according to a first embodiment of the present invention.

FIG. 17 shows a state transition including gated transmission of a reverse pilot channel. The base station and the mobile station share configuration information, such as availability of gated transmission and the gating rate, before making a state transition through the service negotiation in the process of connecting the packet service.

Referring to FIG. 17, the MAC layer transmits an RC-unlock request message to the RC in step 801, and the RC then determines whether to make a state transition. When a transition to the control hold state is requested, the RC examines whether gated transmission is available for the reverse pilot channel. When the gated transmission is available, the RC checks the present radio environment or the base station's environment to determine a proper gating rate, and then transmits, in step 802, SIG-release.request information to the SIG along with a factor indicating that the gated transmission will be performed. Thereafter, in step 803, the RC transmits a gating request primitive to the CE. The SIG then transmits an extended release message to the mobile station in step 804. Upon receipt of the gating request information in step 805, the CE performs gated transmission beginning at an action time ACTION_TIME indicated by the extended release message.

The extended release message transmitted from the base station is provided to the SIG through the physical channel configuration element CE in step 805. Upon receipt of the extended release message, the SIG of the mobile station transmits SIG-release.indication information to the RC along with gating factors of the reverse pilot channel, in step 806. Upon receipt of the above information, the RC analyzes the gating-related factors and transfers the resulting value to the CE in step 808. Further, the RC transmits to the MAC a state transition-related primitive in step 807, and transmits the state transition results to the SIG in step 809. The SIG transmits, in step 810, an extended release response message to the base station, and the mobile station makes a transition to the control hold state at the action time indicated by the extended release message and simultaneously performs gated transmission on the reverse pilot channel.

With regard to the gating procedure performed in the control hold state according to the first exemplary embodiment, the base station and the mobile station determine a gating rate in the call setup process and then transition to the active state. Thereafter, when a transition happens from the active state to the control hold state, the base station determines a gating rate proper for the present radio environment and then transmits an extended release message including the determined gating rate to the mobile station. Upon receipt of the extended release message, the mobile station determines whether to accept the gating rate included in the extended release message and then transmits the determined results to the base station along with the extended release response message. Therefore, the base station and the mobile station perform the negotiating process by exchanging the extended release message and the extended release response message. When a gating rate, which is acceptable to both the base station and the mobile station, is determined in the negotiating process, the base station and the mobile station perform gating procedure on the transmission signal according to the determined gating rate. That is, at the determined gating rate, the base station gates the signal being transmitted over the forward dedicated control channel and the mobile station gates the signal being transmitted over the reverse pilot channel. The gating can be performed on a time slot unit basis or a power control group unit basis as shown in FIG. 3.

Table 8 below shows a format of the extended release message (ERM) used when indicating a transition from the active state to the control hold state, the suspended state or the dormant state according to an embodiment of the present invention.

TABLE 8

| Field | Length |
| --- | --- |
| FPC_PRI_CHAN | 1 |
| RPC_CHANNEL | 1 |
| CH_IND | 3 |
| CON_REF_INCL | 1 |
| CON_REF | 0 or 8 |
| SCR_SEQ_INCL | 1 |
| SCR_SEQ | 0 or 4 |
| GATING_RATE_INCL | 1 |

TABLE 8-continued

| | |
|---|---|
| PILOT_GATING_RATE | 0 or 2 |
| BLOB | 7 |

Actual Reverse Pilot Gating Rate

| PILOT_GATING_RATE field (binary) | Meaning |
|---|---|
| 00 | Gating rate 1 |
| 01 | Gating rate 1/2 |
| 10 | Gating rate 1/4 |
| 11 | Reserved |

The message shown in Table 8 has been newly defined with an addition of the MAC layer. An FPC_PRI_CHAN field determines a forward channel signal, based on which power control will be performed on a forward inner loop, and it includes a fundamental channel (FCH) except when there exists only the dedicated control channel (DCCH). A RPC_CHANNEL field indicates which channel will be used in transmitting a power control bit (PCB). A CH_IND field indicates a type of the physical channel to be released, determines whether the physical channel is the fundamental channel, the dedicated control channel, or both of the channels, and also determines whether the physical channel is a reverse pilot channel. The last reverse pilot channel field indicates whether gated transmission is available. A CON_REF_INCL field indicates whether a CON_REF field is included or not. The CON_REF field is used to distinguish respective services by uniquely designating the service options when connecting the service options. A SCR_SEQ field is used to distinguish between the suspended state and the dormant state in the signaling layer. A GATING_RATE_INCL field indicates whether a PILOT_GATING_RATE field is included or not. The PILOT_GATING_RATE field indicates a gating rate to be used when actually performing gated transmission, and one of 1, ½ and ¼ gating rates is used. Finally, a BLOB field is used directly by the MAC layer, and is comprised of a logical resource (dtch and dmch) and SR and PURGE_SR fields. Further, the BLOB field includes direct information about MAC state transition. Table 9 below shows a format of the extended release response message (ERRM) generated by the mobile station in replay to the extended release message.

TABLE 9

| Field | Length (bits) |
|---|---|
| CH_IND | 3 |
| BLOB | 7 |

As shown in Table 9, the extended release response message is comprised of a CH_IND field and a BLOB field, and has the function of confirming the corresponding message.

Figure 18:
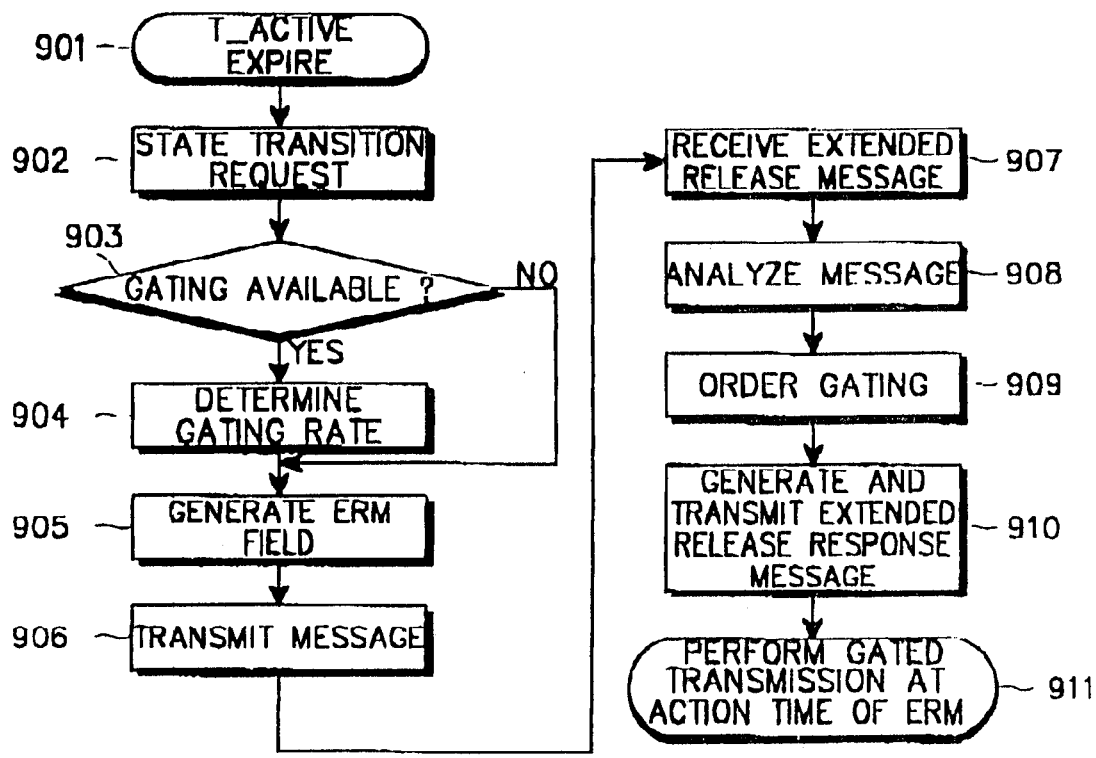
FIG. 18 shows a process for performing gated transmission when a transition to the control hold state happens in response to a state transition request generated in the active state during the process of FIG. 17 according to a first embodiment of the present invention.

FIG. 18 shows a process for performing gated transmission when a transition to the control hold state happens in response to a state transition request generated in the active state during the process of FIG. 17. In FIG. 18 steps 901–906 are performed by the base station, and steps 907–911 are performed by the mobile station.

When the period of non-transmission lasts to expire a timer $T_{Active}$ in the active state in step 901 or when a state transition request to the control hold state is requested by the system in step 902, the system resource controller 291 of the base station compares a service configuration record with a system environment element stored in the system data base 293 in step 903, to determine whether the gated transmission is available or not. In step 904, the base station determines the gating rate proper for the present radio condition depending on the determined overall system configuration. The gating rate is determined taking into consideration the traveling speed of the mobile station and the channel environment on the basis of the gating rate determined in the service negotiating process. Since an increase in traveling speed of the mobile station makes it difficult to acquire synchronization, it is preferable to select a gating rate having the higher value. By using the determined gating rate, the message generator/analyzer 292 of FIG. 5 generates the PILOT_GATING_RATE field of the extended release message in step 905. Thereafter, the base station transmits the generated message to the mobile station in step 906.

The mobile station then receives the extended release message transmitted from the base station in step 907, and analyzes the received message using the message generator/analyzer 392 of FIG. 6 in step 908. At this point, the mobile station receives the gating rate. The resource controller 391 of the mobile station writes the received gate rate in the resource data base 393 and provides the gating rate to the gated transmission controller 390 in step 909. Further, in step 910, the mobile station generates an extended release response message for confirming state transition and transmits the generated extended release response message to the base station. In step 911, the gated transmission controller 390 of the mobile station performs gating on the reverse pilot channel at the action time indicated by the extended release message.

Second Exemplary Embodiment

A detailed description will be made regarding an operation of performing gated transmission in the control hold state according to a second embodiment of the present invention.

In this embodiment, the base station and the mobile station determine a gating rate in the call setup process, and the base station transmits the determined gating rate to the mobile station when a transition to the control hold state happens. Then, at the determined gating rate, the base station gates the transmission signal on the forward dedicated control channel and the mobile station gates the transmission signal on the reverse pilot channel, in the control hold state. The base station determines the gating rate in the call setup process as shown in the procedure of FIG. 15.

A detailed description will be made regarding the gating rate determining procedure according to the second embodiment, with reference to FIG. 15.

Referring to FIG. 15, through steps 601–604, the dedicated control channel and the dedicated traffic channel are assigned. Thereafter, in steps 605 and 606, the base station performs a procedure that determines the capability of the mobile station and its available services. At this point, the information provided from the mobile station includes a field for providing the base station with information about availability of the rated transmission for the reverse pilot channel and whether it supports gating rates of ½, ¼ and/or ⅛. Further, in steps 607–610, the mobile station transmits the service connect message to the base station, by setting a gating rate in a field, assigned by the base station, of the service connect message.

Formats of messages exchanged between the base station and the mobile station corresponding to the Extended Status Request Message 605 and the Extended Status Response Message 606 in the procedure of FIG. 15 are shown in Tables 10 to 14 below.

Table 10 shows status request message fields transmitted during call setup from the base station to check the service property and capacity of the mobile station in order to perform packet data service in a CDMA mobile communication system.

TABLE 10

| Field | Length (bits) |
|---|---|
| QUAL_INFO_TYPE | 8 |
| QUAL_INFO_LEN | 3 |
| Type-specific fields | 8 × QUAL_INFO_LEN |
| NUM_FIELDS | 4 |
| NUM_FIELDS occurrences of the following field: | |
| RECORD_TYPE | 8 |

Table 11 below shows status response message fields transmitted from the mobile station in reply to the status request message transmitted during call setup from the base station to check the service property and capacity of the mobile station in order to perform packet data service in a CDMA mobile communication system.

TABLE 11

| Field | Length (bits) |
|---|---|
| QUAL_INFO_TYPE | 8 |
| QUAL_INFO_LEN | 3 |
| Type-specific fields | 8 × QUAL_INFO_LEN |
| One or more occurrences of the following record: | |
| RECORD_TYPE | 8 |
| RECORD_LEN | 8 |
| Type-specific fields | 8 × RECORD_LEN |

Table 12 below shows extended status response message fields transmitted from the mobile station in reply to the status request message transmitted during call setup from the base station to check the service property and capacity of the mobile station in order to perform packet data service in a CDMA mobile communication system.

TABLE 12

| Field | Length (bits) |
|---|---|
| QUAL_INFO_TYPE | 8 |
| QUAL_INFO_LEN | 3 |
| Type-specific fields | 8 × QUAL_INFO_LEN |
| NUM_INFO_RECORDS | 4 |
| NUM_INFO_RECORDS occurrences of the following record: | |
| RECORD_TYPE | 8 |
| RECORD_LEN | 8 |
| Type-specific fields | 8 × RECORD_LEN |

Table 13 below shows a format of a mobile station capability record added to an extended status response message and a status response message transmitted from the mobile station in reply to the status request message transmitted during call setup from the base station to check the service property and capacity of the mobile station in order to perform packet data service in a CDMA mobile communication system.

TABLE 13

| Type-Specific Field | Length (bits) |
|---|---|
| ACCESS_ENTRY_HO | 1 |
| ACCESS_PROBE_HO | 1 |
| ANALOG_SEARCH | 1 |
| HOPPING_BEACON | 1 |
| MAHHO | 1 |
| PUF | 1 |
| ANALOG_553A | 1 |
| DCCH_ONLY | 1 |
| DCCH_AND_FCH | 1 |
| MAC_CF_SUPPORTED | 1 |
| If MAC_CF_SUPPORTED is set to '1', the following record is included: | |
| CHS_SUPPORTED | 1 |
| GATED_REV_PILOT_SUPPORTED | 0 or 1 |
| GATING_RATE_SET | 0 or 2 |
| SUSPENDED_SUPPORTED | 1 |
| EXT_CAP_INCLUDED | 1 |
| If EXT_CAP_INCLUDED is set to '1', the following record is included: | |
| MABO | 1 |
| SDB | 1 |
| SAVE_SCR | 1 |
| SAVE_ACTIVE_SET | 1 |
| RESERVED | 1 |
| GATING_RATE SET Field (binary) | Gating Rates Capability |
| 00 | Gating rates 1 |
| 01 | Gating rates 1 and 1/2 |
| 10 | Gating rates 1, 1/2, 1/4 and 1/8 |
| 11 | Reserved |

Table 14 below shows a system configuration record added to service connect message fields transmitted during call setup from the base station to the mobile station in the procedure of FIG. 15 in order for the mobile station to perform gated transmission in the control hold state of packet data service in a CDMA mobile communication system.

TABLE 14

| FPC_INCL | 1 |
|---|---|
| FPC_MODE | 0 or 3 |
| FPC_OLPC_FCH_INCL | 0 or 1 |
| FPC_FCH_FER | 0 or 5 |
| FPC_FCH_MIN_SETPT | 0 or 8 |
| FPC_FCH_MAX_SETPT | 0 or 8 |
| FPC_OLPC_DCCH_INCL | 0 or 1 |
| FPC_DCCH_FER | 0 or 5 |
| FPC_DCCH_MIN_SETPT | 0 or 8 |
| FPC_DCCH_MAX_SETPT | 0 or 8 |
| RPC_WCL | 1 |
| RPC_CHANNEL | 0 or 1 |
| GATING_RATE_INCL | 1 |
| PILOT_GATE_RATE | 0 or 2 |
| LPM_IND | 1 |
| NUM_LPM_ENTRIES | 0 or 4 |
| If LPM_IND = '1', include NUM_LPM_ENTRIES occurrences of the following six-field record: | |
| FORWARD_FLAG | 1 |
| REVERSE_FLAG | 1 |
| LOGICAL_CHANNEL | 4 |
| SR_ID | 3 |
| PRIORITY | 4 |
| PH_RESOURCE_ID | 4 |
| RESERVED | 0–7(as needed) |

TABLE 14-continued

Reverse Pilot Gating rate

| PILOT_GATING_RATE field (binary) | Meaning |
|---|---|
| 00 | Gating rates 1 |
| 01 | Gating rates 1/2 |
| 10 | Gating rates 1/4 |
| 11 | Gating rates 1/8 |

With regard to Tables 10 to 14, the status request message shown in Table 10 is transmitted from the base station to the mobile station. Upon receipt of the status request message, the mobile station transmits a message informing its capability. The messages shown in Tables 11 and 12 are transmitted from the mobile station at the request of the base station, and Tables 11 and 12 show component fields of the status request message and the extended status request message, respectively.

Table 13 shows record fields added to the messages of Tables 11 and 12 in order to support gated transmission. The gated transmission-related fields added to the existing service configuration record include a GATED_REV_PILOT_SUPPORTED field and a GATING_RATE_SET field of Table 13. Here, the GATED_REV_PILOT_SUPPORTED field indicates whether or not the service configuration record include the GATING_RATE_SET field, and can be regarded as a field for designating whether the reverse pilot channel is supported or not. The GATING_RATE_SET field indicates a capability for a gating rate to be actually used during gated transmission; when it is '00', the mobile station supports only the gating rate 1 during rated transmission; when it is '01', the mobile station supports the gating rates 1 and ½; when it is '10', the mobile station supports the gating rates 1, ½ and ¼; and when it is '11', the mobile station supports the gating rates 1, ½, ¼ and ⅛.

Upon receipt of the status response message or the extended status response message including the fields of Table 13, the base station can detect a possible gating capability of the mobile station, and assigns a gating rate of the mobile station consulting the gating rate capability of Table 13. The message fields for gated transmission, shown in Table 13, are added only when the mobile station and the base station support the control hold state of the MAC layer using the dedicated control channel.

The service connect message shown in Table 14 is used when the base station actually performs gated transmission upon receipt of the message of Table 13 transmitted from the mobile station, and Table 14 shows the fields indicating the gating rate when the base station and the mobile station perform gated transmission according to a value of the PILOT_GATE_RATE field. Upon receipt of the message of Table 13 including the message of Table 14, the mobile station detects a field having the gating rate information and stores the value in a memory of the mobile station.

Figure 19:
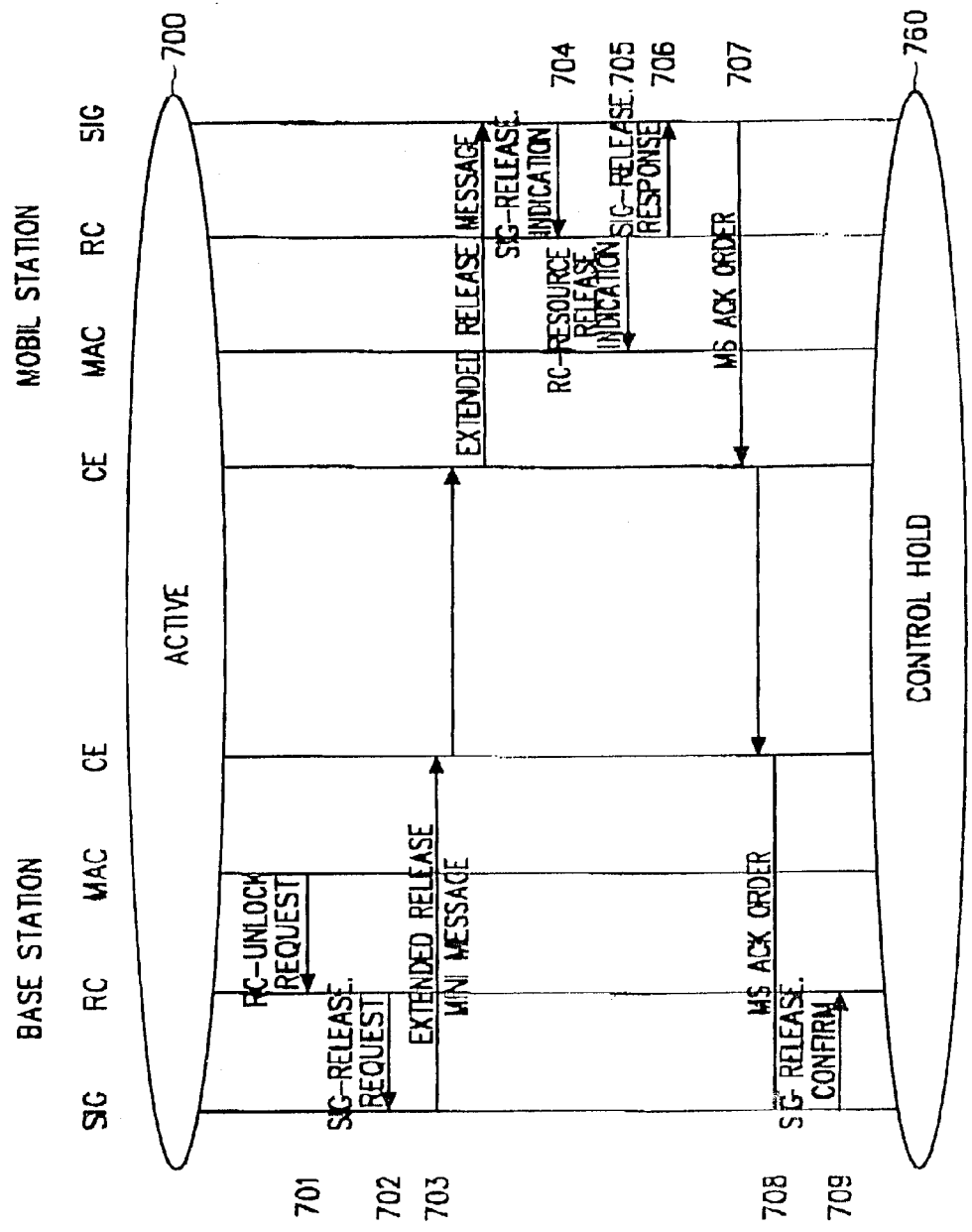
FIG. 19 shows a call processing procedure during a transition from the active state to the control hold state in the case where the MAC layer is added during packet data service in a CDMA mobile communication system according to a second embodiment of the present invention.

FIG. 19 shows a call processing procedure during a transition from the active state to the control hold state in the case where the MAC layer is added during packet data service in the future CDMA mobile communication system.

Referring to FIG. 19, when the period of non-transmission exceeds the time $T\_{Active}$ or when a state transition is requested by the system, the MAC layer transmits to the resource controller (RC) an RC-unlock request message for requesting a transition from the active state to the control hold state, in step 701. Upon receipt of the a corresponding primitive from the MAC layer, the RC transmits SIG-release.request information to the SIG in step 702. Upon receipt of a message indicating a transition to the control hold state, the SIG transmits an extended release message or an extended release mini-message (ERMM) to the mobile station through a physical channel configuration element (CE) in step 703.

Then, upon receipt of the above message, the SIG of the mobile station transmits SIG-release.indication information to the RC in step 704. Thereafter, in step 705, the RC sends RC-resource release.indication information to the MAC so as to order the state transition. Further, in step 706, the RC sends SIG-release.response information to the SIG. The SIG then transmits an MS ACK order message to the base station through the physical channel configuration element CE, in step 707. Upon receipt of the MS ACK order message at step 708, the SIG of the base station transmits SIG-release.confirm information to the RC in step 709, thereby completing the state transition.

The call processing procedure performed in FIG. 19 makes a state transition not including the gated transmission.

Figure 20:
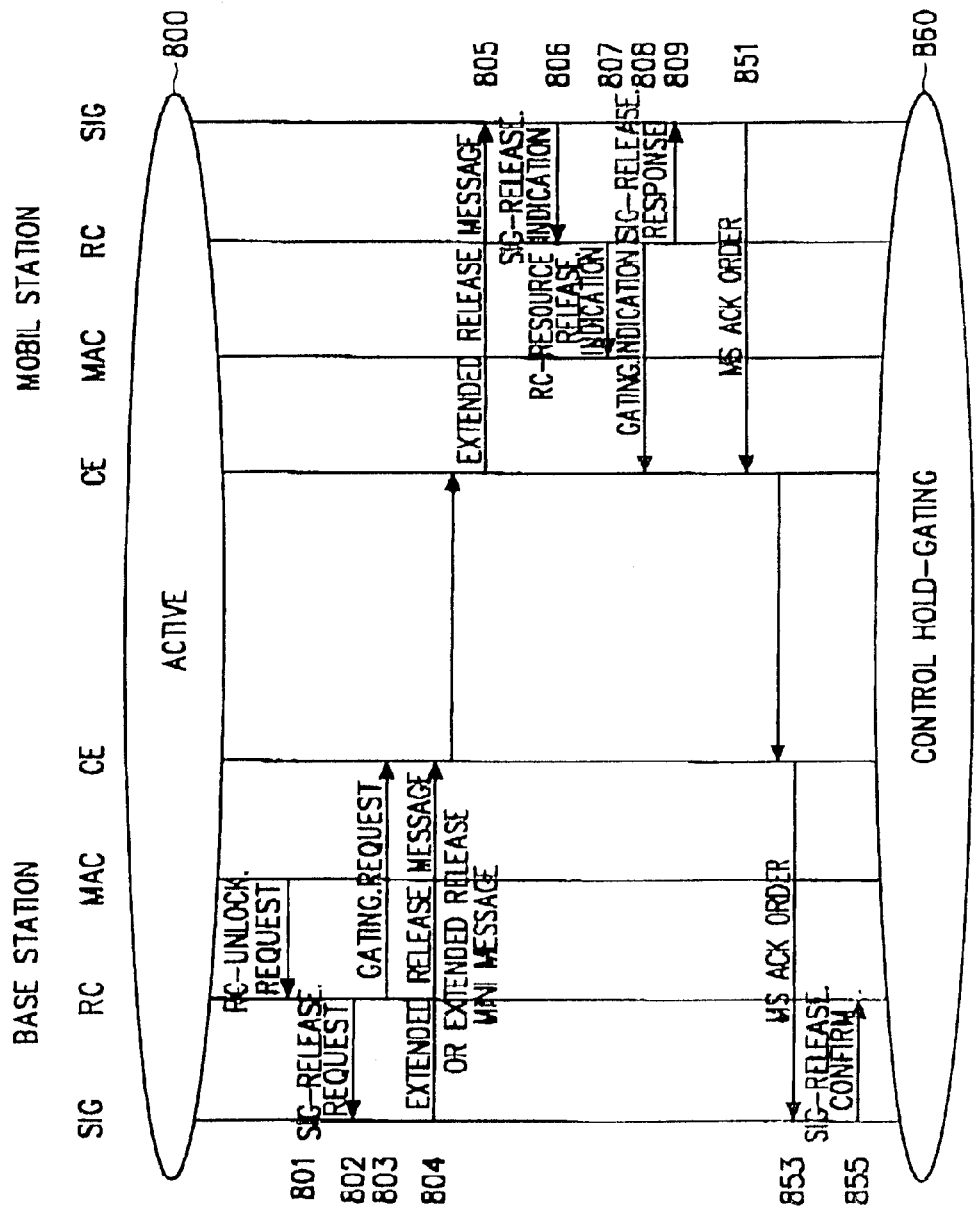
FIG. 20 shows a state transition including gated transmission of a reverse pilot channel according to a second embodiment of the present invention.

FIG. 20 shows a state transition including gated transmission of a reverse pilot channel. The base station and the mobile station share configuration information such as availability of gated transmission and the gating rate before making a state transition through the service negotiation in the process of connecting the packet service.

Referring to FIG. 20, the MAC layer transmits an RC-unlock.request message to the RC in step 801, and the RC then determines whether to make a state transition. When a transition to the control hold state is requested, the RC examines whether gated transmission is available for the reverse pilot channel. Since availability of gated transmission of the mobile station and the gating rate to be used for gated transmission are already determined in the call setup process, the RC of the base station transmits, in step 802, SIG-release.request information to the SIG along with a factor indicating that the gated transmission will be performed. Thereafter, in step 803, the RC of the base station transmits a gating request primitive to the CE. The SIG of the base station then transmits an extended release message or an extended release mini-message to the mobile station in step 804. Upon receipt of the gating request information in step 805, the CE gates the signal being transmitted over the forward dedicated control channel at the gating rate beginning at an action time ACTION_TIME.

As described above, when no data is transmitted over the traffic channel for a predetermined time in the active state, the base station transmits to the mobile station the extended release message or the extended release mini-message including the gating rate information determined in the call setup process, and then transitions to the control hold state. Here, when transmitting the extended release message, the base station can either transmit the gating rate determined in the call setup process or transmit another gating rate out of the mobile station's gating rate capability checked in the call setup process. Alternatively, when transmitting the extended release mini-message, the base station transmits the gating rate determined in the call setup process. Therefore, when a transition occurs from the active state to the control hold state, the base station either transmits the gating rate information determined in the call setup process to the mobile station, without negotiation with the mobile station on the gating rate, or chooses a gating rate serviceable by the mobile station and transmits the chosen gating rate to the mobile station. That is, the base station can either transmit the gating rate determined in the call setup process, or choose a different gating rate out of the mobile station's gating rates and transmit the chosen gating rate. In addition, the extended release message and the extended release mini-message include an action time for gating the transmission signals of the forward dedicated control channel and the reverse pilot channel at the determined gating rate.

Upon receipt of the extended release message or the extended release mini-message, the SIG of the mobile station transmits SIG-release.indication information to the RC along with gating factors of the reverse pilot channel, in step 806. Upon receipt of the above information, the RC analyzes the gating-related factors and transfers the resulting value to the CE in step 808. Further, the RC transmits to the MAC a state transition-related primitive in step 807, and transmits SIG-release.response information to the SIG in step 809. The SIG transmits an MS ACK order message to the base station through the CE, in step 851. Thereafter, the mobile station makes a transition to the control hold state at the action time of the extended release message of the extended release mini-message, and simultaneously gates the reverse pilot channel.

With regard to the gating procedure performed in the control hold state according to the second embodiment, the base station and the mobile station determine a gating rate in the call setup process. Thereafter, when a transition happens from the active state to the control hold state, the base station selects as a gating rate the gating rate determined in the call setup process or one of the serviceable gating rates of the mobile station, as determined in the call setup process. The chosen gating rate is transmitted by the base station to the mobile-station. The mobile station then gates the transmission signal on the reverse pilot channel at the provided gating rate in the control hold state.

Table 15 below shows the extended release message used when ordering a state transition from the active state to the control hold state, the suspended sate and the dormant state according to an embodiment of the present invention.

TABLE 15

| Field | Length (bits) |
|---|---|
| FPC_PRI_CHAN | 1 |
| RPC_CHANNEL | 1 |
| CH_IND | 3 |
| CON_REF_INCL | 1 |
| CON_REF | 0 or 8 |
| SCR_SEQ_INCL | 1 |
| SCR_SEQ | 0 or 4 |
| GATING_RATE_INCL | 1 |
| PILOT_GATING_RATE | 0 or 2 |
| BLOB | 7 |

Actual Reverse Pilot Gating rate

| PILOT_GATING_RATE field (binary) | Meaning |
|---|---|
| 00 | Gating rate 1 |
| 01 | Gating rate 1/2 |
| 10 | Gating rate 1/4 |
| 11 | Gating rate 1/8 |

Shown in Table 15 is the extended release message that the base station transmits during state transition. This message has been newly defined with an addition of the MAC layer. An FPC_PRI_CHAN field determines a forward channel signal, based on which power control will be performed on a forward inner loop, and it includes a fundamental channel (FCH) except when there exists only the dedicated control channel (DCCH). A RPC_CHANNEL field indicates which channel will be used in transmitting a power control bit (PCB). A CH_IND field indicates a type of the physical channel to be released, determines whether the physical channel is the fundamental channel, the dedicated control channel, or both of the channels, and also determines whether the physical channel is a reverse pilot channel. The last reverse pilot channel field indicates whether the gated transmission is available. A CON_REF_INCL field indicates whether a CON_REF field is included or not. The CON_REF field is used to distinguish respective services by designating unique to the service options when connecting the service options. A SCR_SEQ field is used to distinguish between the suspended state and the dormant state in the signaling layer. A GATING_RATE_INCL field indicates whether a PILOT_GATING_RATE field is included or not. The PILOT_GATING_RATE field indicates a gating rate to be used when actually performing gated transmission, and one of 1, ½ and ¼ gating rates is used. Finally, a BLOB field is used directly by the MAC layer, and is comprised of a logical resource (dtch and dmch) and SR and PURGE_SR fields. Further, the BLOB field includes direct information about MAC state transition.

Figure 21:
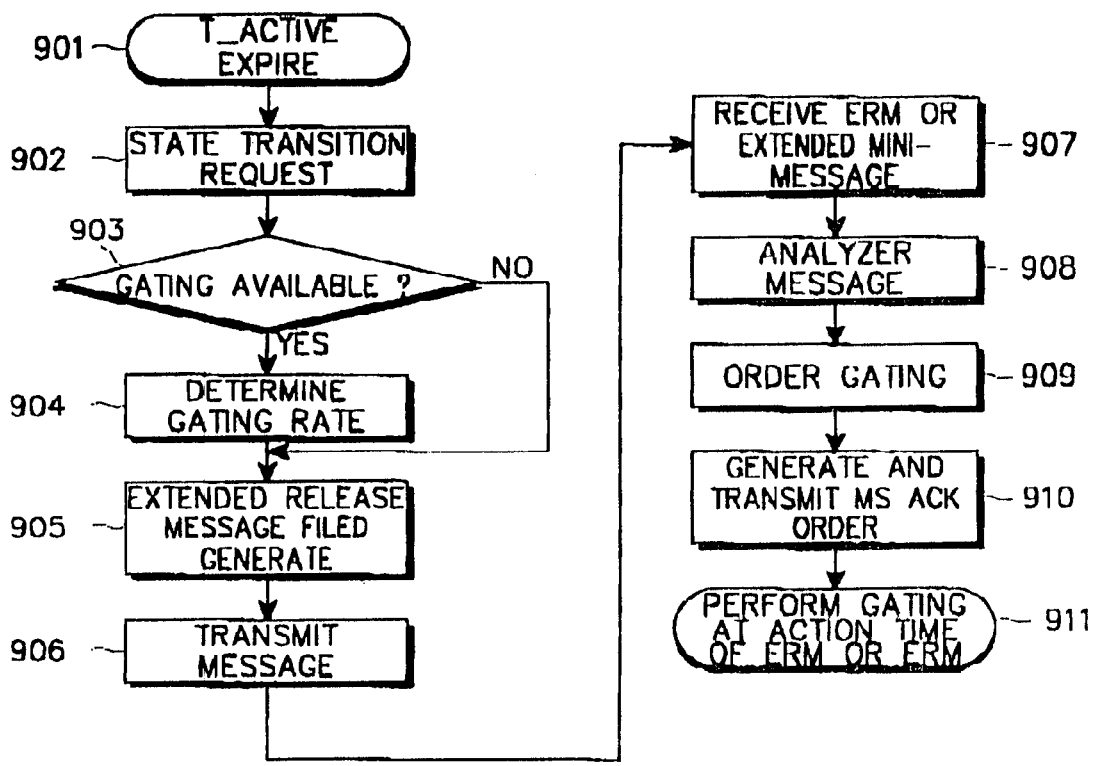
FIG. 21 shows a process for performing gated transmission when a transition to the control hold state happens in response to a state transition request generated in the active state during the process of FIG. 20 according to a second embodiment of the present invention.

FIG. 21 shows a process for performing gated transmission when a transition to the control hold state happens in response to a state transition request generated in the active state during the process of FIG. 20. In FIG. 21 steps 901–906 are performed by the base station, and steps 907–911 are performed by the mobile station.

When the period of non-transmission lasts to expire a timer T Active in the active state in step 901 or when a state transition request to the control hold state is requested by the system in step 902, the system resource controller 291 of the base station compares a service configuration record with a system environment element stored in the system data base 293 in step 903, to determine whether the gated transmission is available or not. In step 904, the base station determines the gating rate proper for the present radio condition depending on the determined overall system configuration. The gating rate is determined taking into consideration a traveling speed of the mobile station and the channel environment on the basis of the gating rate determined in the service negotiating process. Since an increase in traveling speed of the mobile station makes it difficult to acquire synchronization, it is preferable to select a gating rate having the higher value. By using the determined gating rate, the message generator/analyzer 292 of FIG. 5 generates the PILOT_GATING_RATE field of the extended release message in step 905. Thereafter, the base station transmits the generated message to the mobile station in step 906. The transmitted message can be the extended release message or the extended release mini-message. When transmitting the extended release message, the base station can transmit either the gating rate determined in the call setup process or a gating rate selected from the mobile station's serviceable gating rates checked in the call setup process. Alternatively, when transmitting the extended release mini-message, the base station transmits the gating rate determined in the call setup process.

The mobile station then receives the extended release message or the extended release mini-message transmitted from the base station in step 907, and analyzes the received message using the message generator/analyzer 392 of FIG. 6 in step 908. At this point, the mobile station receives the gating rate. The resource controller 391 of the mobile station writes the received gate rate in the resource data base 393 and provides the gating rate to the gated transmission controller 390 in step 909. Further, in step 910, the mobile station generates an MS ACK order message for confirming state transition and transmits the generated message to the base station. As described above, upon receipt of the extended release message or the extended release mini-message transmitted from the base station, the mobile station determines the gating rate of the mobile station according to the gating rate included in the received message, and transmits a corresponding response message to the base station. Therefore; it is understood that the mobile station does not perform the negotiating procedure for determining the gating rate. In step 911, the gated transmission controller 390 of the mobile station performs gating on the reverse pilot channel at the action time of the extended release message.

Figure 22:
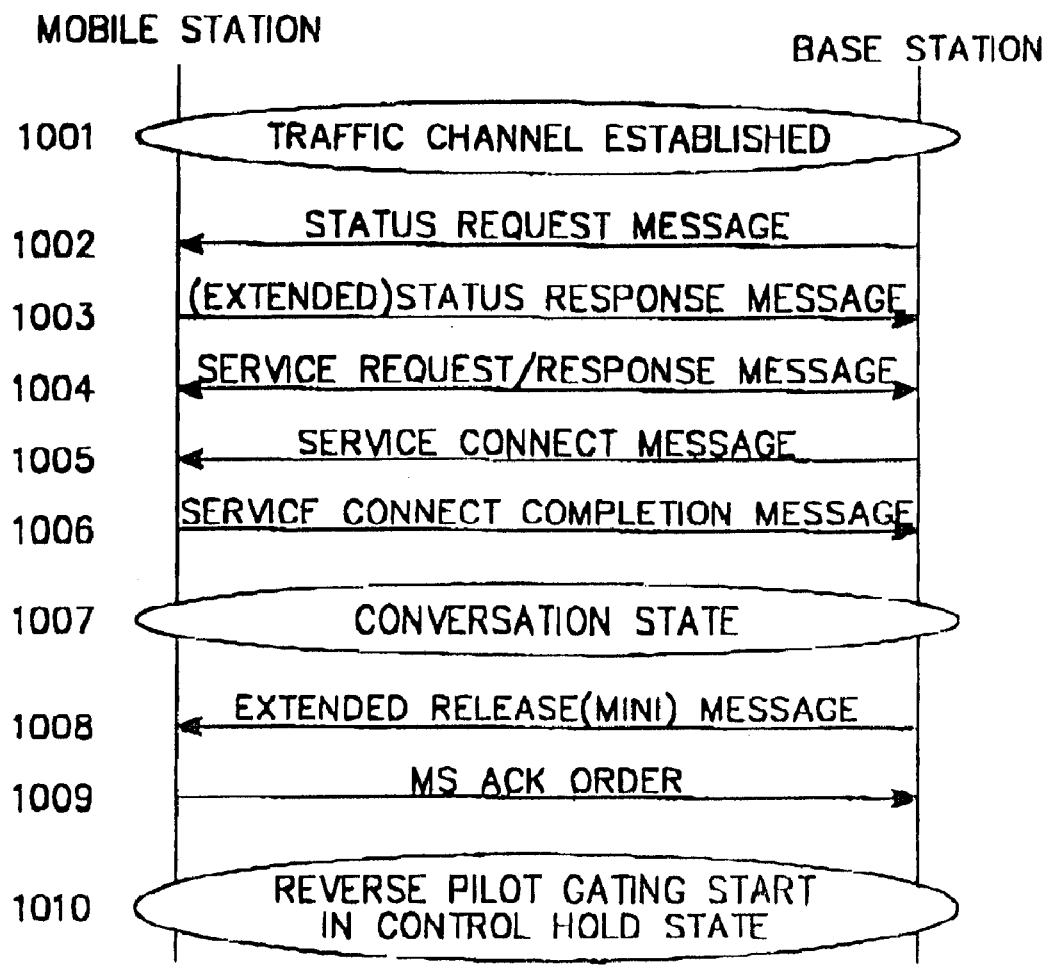
FIG. 22 shows a procedure in which a transition to the active state happens after determining a gating-rate while entering the control hold state, and the base station transmits the determined gating rate to the mobile station in the active state and then transitions to the control hold state according to a second embodiment of the present invention.

FIG. 22 shows a procedure in which a transition to the active state happens after determining a gating rate while entering the control hold state, and the base station transmits the determined gating rate to the mobile station in the active state and then transitions to the control hold state.

Referring to FIG. 22, in step 1003, the mobile station sends information about its gating rate capability to the base station. In step 1005, the base station sends information about a gating rate used in the control hold state to the mobile station. Then, in step 1007, the base station and the mobile station enter a conversation state. At this point, the base station and the mobile station make an appointment for the gating rate to be used when transitioning to the control hold state. Upon receipt of the extended release message from the base station in step 1008, the mobile station stores the gating rate included in the received message, transitions to the control hold state at the action time, and then performs gated transmission. Here, it is possible to perform gated transmission at a gating rate other than the gating rate determined in the call setup process. However, upon receipt of the extended release mini-message from the base station in step 1008, the mobile station performs gated transmission in the control hold state at the gating rate appointed when receiving the service connect message.

Figure 23:
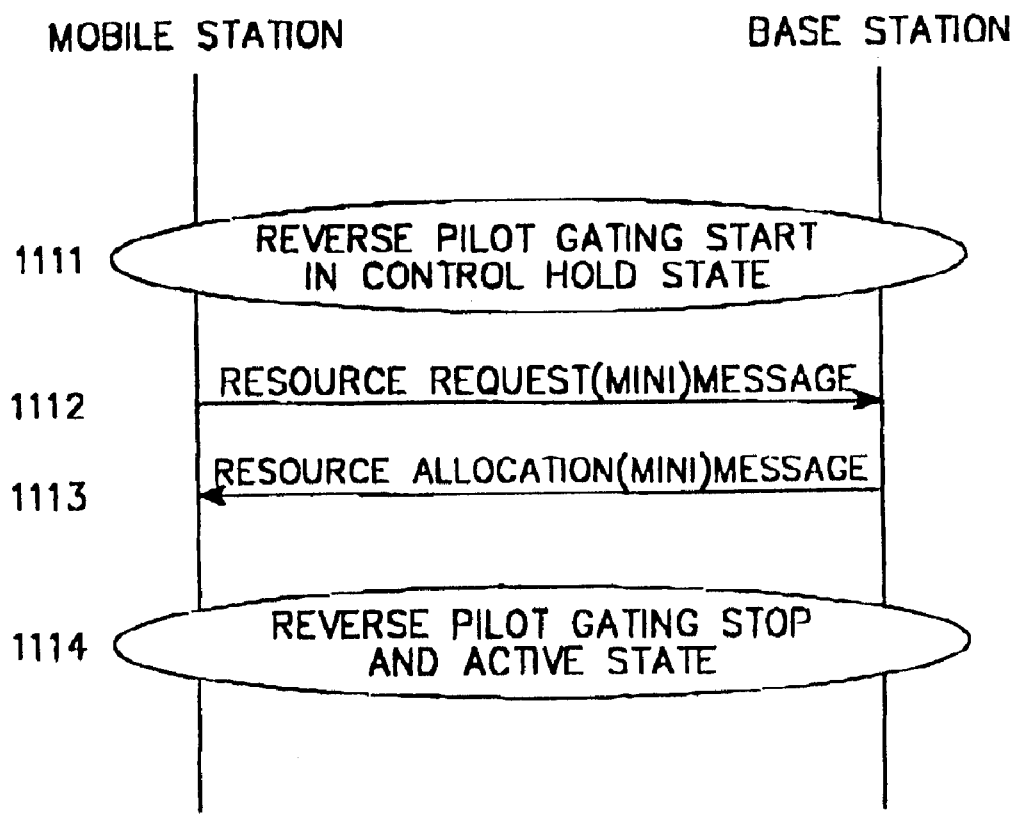
FIG. 23 shows a procedure for performing gated transmission in the control hold state according to a second embodiment of the present invention.

FIG. 23 shows a procedure for performing gated transmission in the control hold state.

Referring to FIG. 23, in step 1111, the mobile station and the base station perform gated transmission in the control hold state. In this state, when the mobile station transmits, in step 1112, a resource request message or a resource request mini-message requesting a transition to the active state to the base station, the base station transmits a resource allocation message or a resource allocation mini-message to the mobile station in step 1113. At this point, the base station and the mobile station transition from the control hold state to the active state at the action time, in step 1114, and the gated transmission between the base station and the mobile station is completed. When transmitting the reverse pilot channel signal during the transition from the control hold state to the active state, the mobile station gates transmission of the PCB signal at the set gating rate, but continuously transmits the pilot signal, as shown in FIG. 4. By doing so, the base station can rapidly acquire synchronization with the mobile station. After synchronization, the base station and the mobile station release the gated transmission and then transition to the active state.

Continuous transmission of the reverse pilot channel in the control hold state is advantageous in that the base station can avoid a sync re-acquisition process. However, this causes an increase in interference with the reverse link, thereby reducing the reverse capacity and increasing power consumption of the mobile station. Further, continuous transmission of the reverse power control bit over the forward link will cause an increase in interference with the forward link and a decrease in capacity of the forward link.

To solve such problems, the mobile station sends information about its gating rate capability to the base station during call setup, and the base station transmits information about the gating rate to be used in the control hold state. Then, the base station and the mobile station transition to the active state after determining the gating rate to be used in the next control hold state. Thereafter, when a transition occurs from the active state to the control hold state, the base station and the mobile station perform gated transmission on the reverse pilot channel at the previously determined gating rate. In this manner, it is possible to minimize the sync re-acquisition time of the base station, and support gated transmission in which an increase in interference due to transmission of the reverse pilot channel and an increase in interference due to transmission of the reverse power control bit over the forward link can be minimized, thereby increasing the channel capability of the reverse link.

In addition, it is possible to previously set a gating rate to be used between the base station and the mobile station in the control hold state, and again set the gating rate through negotiation between the base station and the mobile station when transitioning to the control hold state.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a gating rate in a base station for a CDMA (Code Division Multiple Access) communication system, comprising the steps of:
    transmitting information for assigning a dedicated control channel and a traffic channel to a mobile station, when a call is generated;
    after call setup, transmitting a message requesting mobile station's capability information to the mobile station;
    receiving the capability information including gating availability information of a reverse pilot signal and information about at least one gating rate, transmitted from the mobile station in reply to the request message; and
    determining a gating rate according to the capability information, transmitting information about the determined gating rate to the mobile station, and performing a communication over the assigned traffic channel.

2. The method as claimed in claim 1, wherein the mobile station's capability information includes information about gating availability and at least one gating rate, when gating is available.

3. The method as claimed in claim 2, wherein the gating rate includes 1, ½, ¼ and ⅛.

4. The method as claimed in claim 3, wherein gated transmission is performed on a power control group unit basis.

5. The method as claimed in claim 3, wherein gated transmission is performed on a time slot unit basis.

6. The method as claimed in claim 1, wherein the base station gates a signal being transmitted over a forward dedicated control channel, at said gating rate.

7. The method as claimed in claim 1, wherein the mobile station gates a signal being transmitted over a reverse pilot/PCB (Power Control Bit) channel, at said gating rate.

8. A data communication method for a base station in a CDMA communication system, comprising the steps of:

transmitting information for assigning a dedicated control channel and a traffic channel to a mobile station; when a call is generated;

after call setup, transmitting a message requesting mobile station's capability information to the mobile station;

receiving the capability information including gating availability information of a reverse pilot signal and information about at least one gating rate, transmitted from the mobile station in reply to the request message;

determining a gating rate according to the capability information, transmitting information about the determined gating rate to the mobile station, and communicating data over the traffic channel assigned during the call setup;

transmitting a state transition message including a gating-on time, when there is no data to communicate in the data communicating step; and gating data communication with the mobile station at the gating-on time at the determined gating rate.

9. The method as claimed in claim 8, wherein when the determined gating rate is unavailable during the step of transmitting the determined gating rate information to the mobile station, another gating rate available among the received gating rates of the mobile station is selected and transmitted.

10. A method for determining a gating rate in a mobile station for a CDMA communication system, comprising the steps of:

after call setup, receiving a message requesting mobile station's capability information transmitted from a base station;

transmitting to the base station the capability information including gating availability information of a reverse pilot signal and information about at least one gating rate in reply to the request message; and receiving information about a gating rate determined according to the capability information from the base station, and communicating over the assigned traffic channel when a call is set up.

11. A data communication method for a mobile station in a CDMA communication method, comprising the steps of:

after call setup, receiving a message requesting mobile station's capability information from a base station;

transmitting to the base station the capability information including gating availability information of a reverse pilot signal and information about at lest one gating rate in reply to the request message of the base station;

receiving a gating rate determined from the base station, and communicating data over a traffic channel assigned;

receiving a state transition message including a gating-on time transmitted from the base station, when there is no data to communicate for a predetermined time in the data communicating step; and gating data communication with the base station at the gating-on time at the determined gating rate.

12. A method for determining a gating rate between a base station and a mobile station in a control hold state in a CDMA communication system, the method comprising the steps of:

after call setup, transmitting a message requesting mobile station's capability information from the base station to the mobile station;

transmitting the capability information including gating availability information of a reverse pilot signal and information about at least one gating rate from the mobile station to the base station in reply to the request message; and transmitting the information about the gating rate determined by the base station to the mobile station, and in reply to the information transmission, communicating data over a traffic channel assigned between the base station and the mobile station during the call setup.

13. A data communication method between the base station and the mobile station in a CDMA communication system, comprising the steps of:

after call setup, transmitting a message requesting mobile station's capability form the base station to the mobile station;

transmitting the capability information including gating availability information of a reverse pilot signal and information about at least one gating rate from the mobile station to the base station in reply to the request message;

transmitting the information about the gating rate determined by the base station to the mobile station, and communicating data over a traffic channel assigned during the call setup;

transmitting a state transition message including a gating-on time from the base station to the mobile station, when there is no data to communicate for a predetermined time in the data communicating step; and gating data communication between the base station and the mobile station at the gating-on time at the determined gating rate.

* * * * *